(12) United States Patent
Kuo et al.

(10) Patent No.: US 11,409,139 B2
(45) Date of Patent: Aug. 9, 2022

(54) SEMICONDUCTOR DEVICE INCLUDING WAVEGUIDE HEATER, AND METHOD AND SYSTEM FOR GENERATING LAYOUT DIAGRAM OF SAME

(71) Applicant: TAIWAN SEMICONDUCTOR MANUFACTURING CO., LTD., Hsinchu (TW)

(72) Inventors: Feng-Wei Kuo, Zhudong Township (TW); Chewn-Pu Jou, Hsinchu (TW); Huan-Neng Chen, Taichung (TW); Lan-Chou Cho, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/897,581

(22) Filed: Jun. 10, 2020

(65) Prior Publication Data
US 2021/0181545 A1   Jun. 17, 2021

Related U.S. Application Data

(60) Provisional application No. 62/948,125, filed on Dec. 13, 2019.

(51) Int. Cl.
*G02F 1/01* (2006.01)
*G02F 1/225* (2006.01)
*G02F 1/21* (2006.01)

(52) U.S. Cl.
CPC .......... *G02F 1/0147* (2013.01); *G02F 1/2257* (2013.01); *G02F 1/212* (2021.01); *G02F 2201/063* (2013.01)

(58) Field of Classification Search
CPC ...... G02F 1/0147; G02F 1/2257; G02F 1/212; G02F 2201/063; G02B 6/122; H01S 5/0085
See application file for complete search history.

(56) References Cited

U.S. PATENT DOCUMENTS

| | | |
|---|---|---|
| 7,260,442 B2 | 8/2007 | Hwang et al. |
| 9,256,709 B2 | 2/2016 | Yu et al. |
| (Continued) | | |

OTHER PUBLICATIONS

"Ultra Compact Size Ta Heater for Precise Temperature Control"; Silicon Photonics NTT-AT; https://www.ntt-at.com/product/siliconphoto/; Jan. 3, 2020; 2 pages.

(Continued)

*Primary Examiner* — John Bedtelyon
(74) *Attorney, Agent, or Firm* — Hauptman Ham, LLP

(57) ABSTRACT

A semiconductor device includes: a transistor layer including components of at least one transistor, a waveguide having a long axis extending in a first direction, and an alpha interconnection layer over the waveguide; a stack of metallization layers over the transistor layer, the stack including one or more beta interconnection layers interposed between corresponding pairs of neighboring ones of the metallization layers; and a heater in the alpha interconnection layer or in one of the one or more beta interconnection layers; and wherein, relative to a second direction substantially perpendicular to the first direction, the heater substantially overlaps at least a portion of the waveguide.

20 Claims, 16 Drawing Sheets

(56) References Cited

U.S. PATENT DOCUMENTS

2013/0156364 A1* 6/2013 Chen ................. G02B 6/12004
　　　　　　　　　　　　　　　　　　　　　　　　　385/14
2014/0040838 A1　　2/2014 Liu et al.
2015/0278429 A1　10/2015 Chang

OTHER PUBLICATIONS

Office Action dated Jun. 4, 2021 for corresponding case No. TW 11020529470. (pp. 1-4).

* cited by examiner

SEMICONDUCTOR DEVICE INCLUDING WAVEGUIDE HEATER, AND METHOD AND SYSTEM FOR GENERATING LAYOUT DIAGRAM OF SAME

PRIORITY CLAIM

The present application claims the priority of U.S. Provisional Application No. 62/948,125, filed Dec. 13, 2019, which is incorporated herein by reference in its entirety.

BACKGROUND

Semiconductor photonics, e.g., silicon photonics, is based on manipulating the thermo-optic effect and/or electro-optic effect exhibited by a semiconductor material. A material which is thermo-optic effective (TOE) changes refractive index in response to changes in temperature. Some materials which are electro-optic effective (EOE) change, e.g., refractive index and/or permittivity, in response to changes in an electric field.

For optical communication which uses a laser as a light source, as speed goals increase (e.g., 10 GBit/s and above), the speed goals become increasingly more difficult to achieve solely by modulating the laser directly. In such circumstances, an option is to use an optical modulator which is external to the laser. An example of an external optical modulator is a Mach-Zehnder modulator (MZM). In an MZM, an input optical path/waveguide is split into first and second waveguides which are recombined at an output waveguide. For semiconductor photonics, a portion of the first waveguide is formed of material that is TOE and/or EOE. Constructive or destructive interference is selectively produced at the output waveguide by subjecting the first portion of the first waveguide to a selectively manipulated first thermal field and/or first electric field. Alternatively, a second portion of the second waveguide is formed of material that is TOE and/or EOE, and the second portion is subjected to a second thermal field and/or a second thermal field which are different than the corresponding first thermal field and second electric field.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1A:
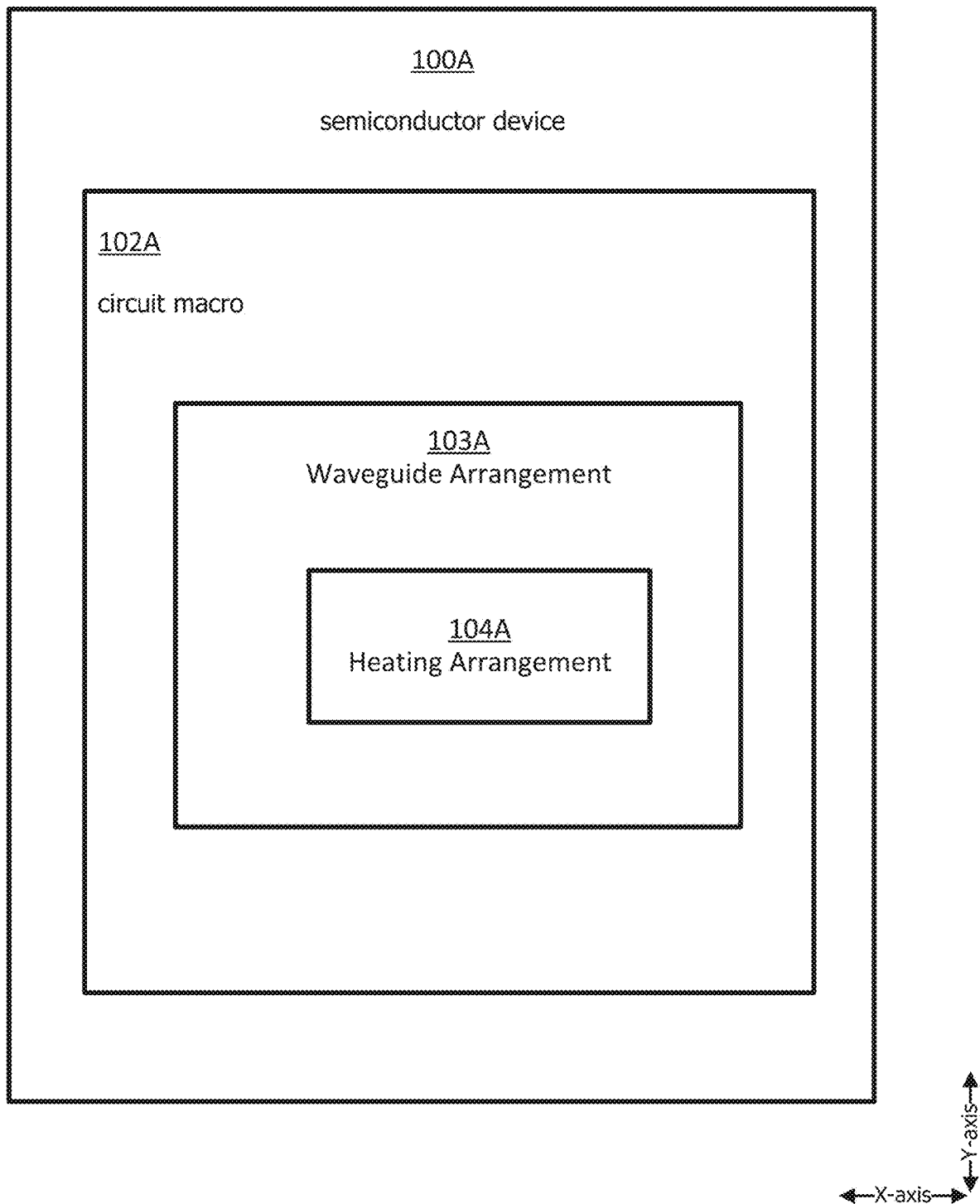
FIG. 1A is a block diagram of a semiconductor device, in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a semiconductor device includes a heating arrangement for a waveguide arrangement. Relative to a first direction, the semiconductor device includes a transistor layer and a stack of metallization layers over the transistor layer. In some embodiments, the waveguide arrangement is in the transistor layer and includes a waveguide having a long axis extending in a second direction substantially perpendicular to the first direction, the transistor layer further including an alpha interconnection layer over the waveguide. The stack further includes one or more beta interconnection layers interposed between corresponding pairs of neighboring ones of the metallization layers. In some embodiments, the heating arrangement includes a heater in the alpha interconnection layer or in one of the one or more beta interconnection layers, and a portion of the waveguide arrangement which is to be heated.

In some embodiments, for a first metallization layer (M_1st layer) over the transistor layer, the heater is in a first beta interconnection layer between the M_1st layer and a second metallization layer (M_2nd layer). Relative to a third direction substantially perpendicular to the first and second directions, the heater substantially overlaps at least a portion of the waveguide which is to be heated. According to another approach, for a portion of a waveguide arrangement which was to be heated, the to-be-heated (TBH) portion of the waveguide arrangement was not located under the metallization stack of metallization layers, nor was the corresponding heater incorporated into the stack of metallization layers, but the heating arrangement was laterally displaced (relative the second and/or third directions) from the stack. Relative to the first and second directions, an advantage of locating the TBH portion of the waveguide arrangement under the stack of metallization layers, and incorporating the corresponding heater into the stack over the TBH portion, according to at least some embodiments, is that a footprint of the heating arrangement and the stack of metallization layers is smaller as compared to the other approach.

In some embodiments, the waveguide is a rib waveguide. According to another approach, the heater included chromium (Cr) and/or gold (Au). In some embodiments, the heater includes tantalum nitride, (TaN), titanium nitride (TiN) or a combination including TaN and TiN, which have corresponding higher resistivities than either Cr or Au. Relative to a given heat output of the heater of the other approach, according to at least some embodiments, an advantage of using TaN and or TiN is that the heater is smaller and/or consumes less power.

FIG. 1A is a block diagram of a semiconductor device 100A, in accordance with at least one embodiment of the present disclosure.

Figure 1B:
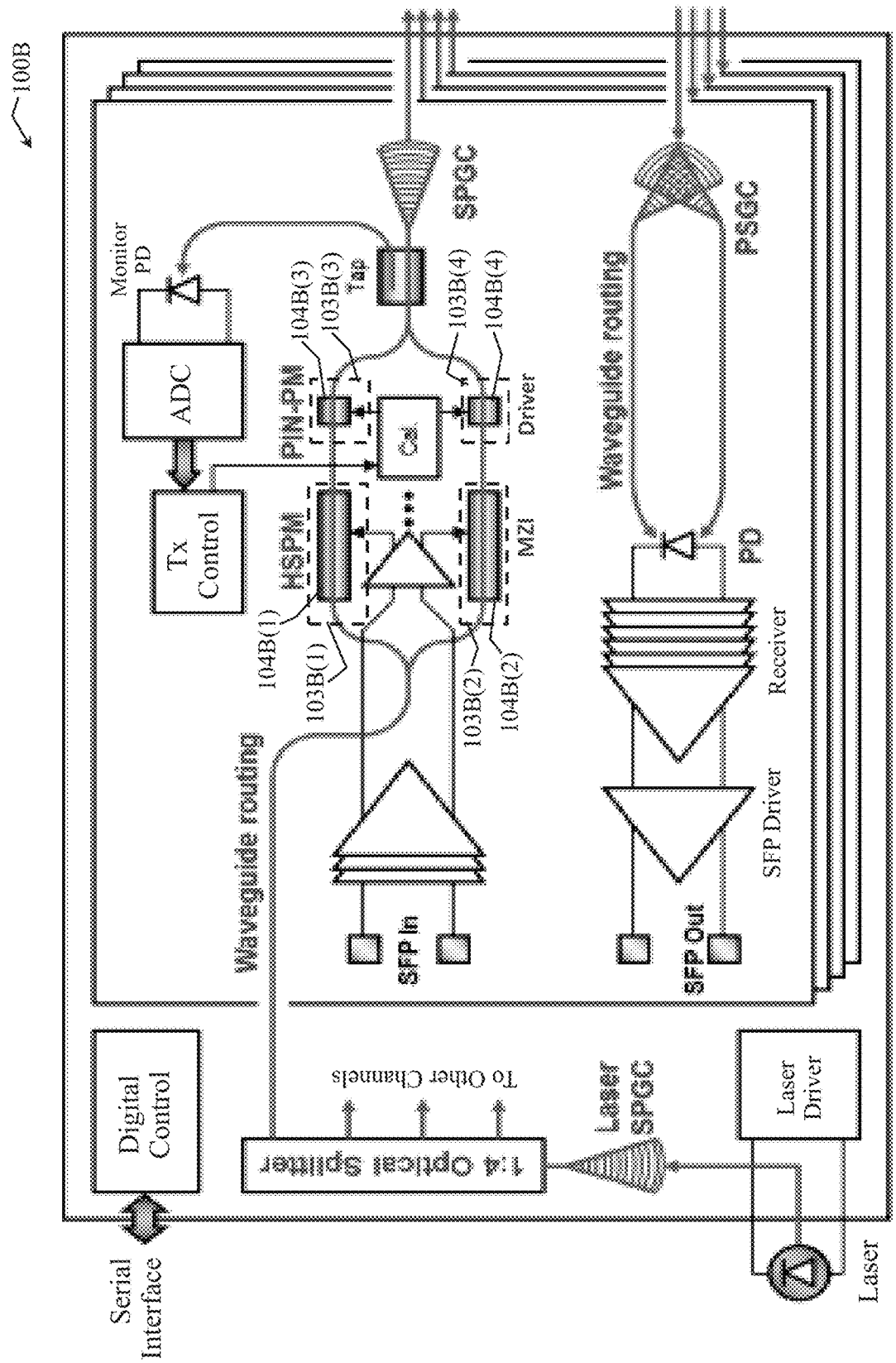
FIG. 1B is a block diagram of a semiconductor device, in accordance with at least one embodiment of the present disclosure.

In FIG. 1, semiconductor device 100A includes, among other things, a circuit macro (hereinafter, macro) 101A. Macro 101A includes, among other things, a waveguide arrangement 103A (see FIGS. 1B, 2, 3A-3D, 4A-4H, or the like). Waveguide arrangement 103A includes, among other things, a heating arrangement 104A (see FIGS. 1B, 2, 3A-3D, 4A-4H, or the like).

FIG. 1B is a block diagram of a semiconductor device 100B, in accordance with at least one embodiment of the present disclosure.

In FIG. 1B, semiconductor device 100B is a transmitter/receiver (Tx/Rx) which includes optical active devices. Among other things, Tx/Rx 100B includes waveguide arrangements 103B(1), 103B(2), 103B(3) and 103B(4) (see FIGS. 2, 3A-3D, 4A-4H, or the like) including corresponding heating arrangements 104B(1), 104B(2), 104B(3) and 104B(4) (see FIGS. 2, 3A-3D, 4A-4H, or the like).

In some embodiments, waveguide arrangement 103B(1) is a high-speed phase modulator (HSPM) which includes a heating arrangement 104B(1). In some embodiments, waveguide arrangement 103B(2) is a Mach-Zehnder Interferometer (MZI) which includes a heating arrangement 104B(2). In some embodiments, waveguide arrangement 103B(3) is p-i-n (PIN) phase modulator (PM) (PIN-PM) which includes a heating arrangement 104B(3). In some embodiments, waveguide arrangement 103B(4) is driver circuit which includes a heating arrangement 104B(4). Among other things, Tx/Rx 100B further includes: single polarization grating couplers (SPGCs), e.g., for laser-emitted light (laser light); a polarization splitting grating coupler (PSGC), e.g., for laser light; photodiodes (PDs); and input and output interface modules, e.g., small form factor (SFP) input and output interface modules.

Figure 2:
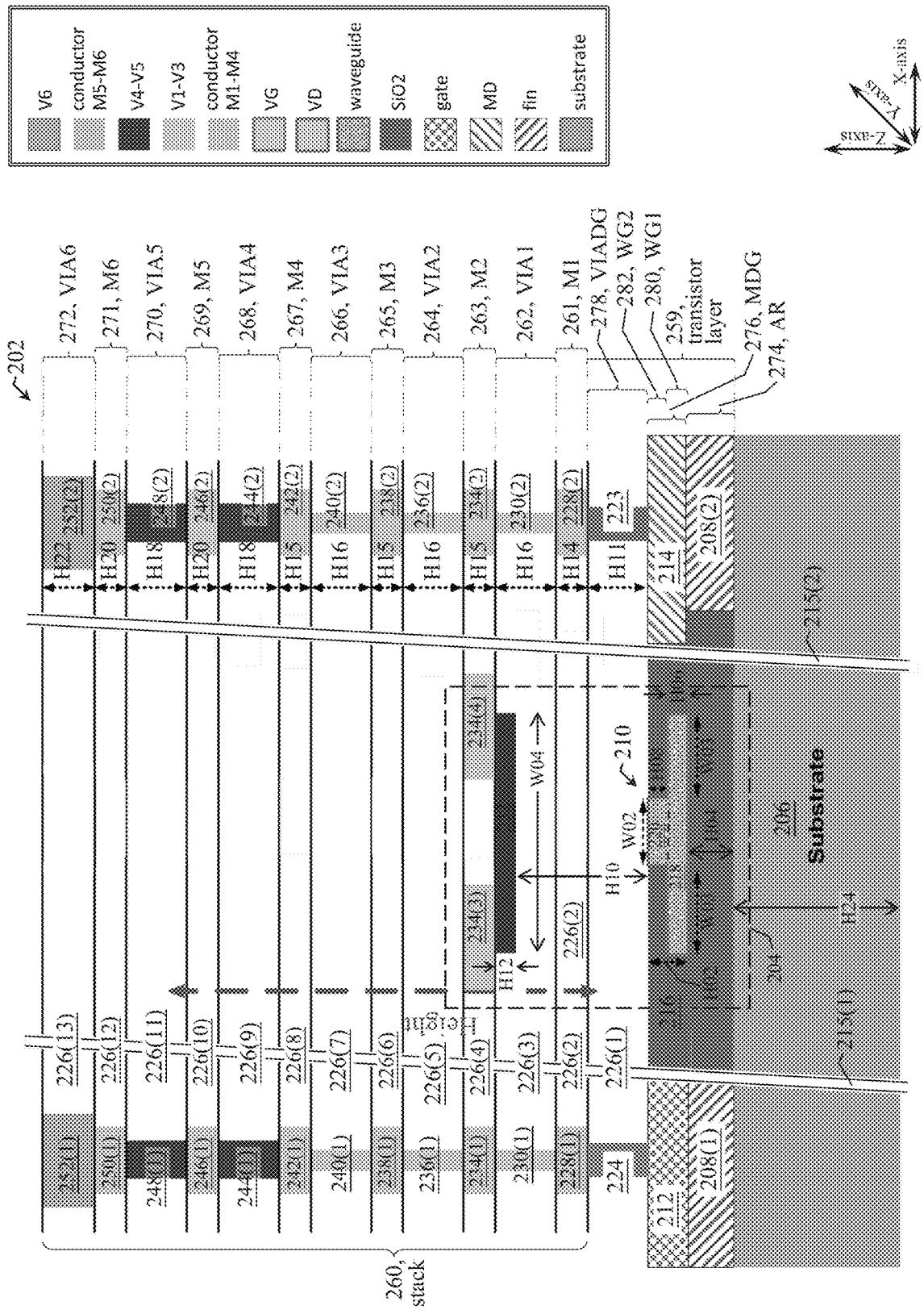
FIG. 2 is a cross-section, in accordance with some embodiments.

FIG. 2 is a cross-section of a portion of a circuit macro 202 of a semiconductor device 100A, in accordance with some embodiments.

In FIG. 2, a first direction is the horizontal direction and a second direction is the vertical direction. In some embodiments, FIG. 2 assumes a Cartesian coordinate system, with the horizontal direction being the X-axis and the vertical direction being the Z-axis.

In FIG. 2, the portion of circuit macro 202 includes: a substrate 206; a transistor layer 259 over substrate 206; and a stack 260 of metallization layers and interspersed interlayer dielectric layers (ILDs). Stack 260 includes a first metallization layer (M1 layer) 261 over transistor layer 259, and a first interconnection layer (VIA1 layer) 262 over M1 layer 261. Here, it will be assumed that the numbering convention of the corresponding design rules of the corresponding semiconductor process technology node begins with a first metallization layer (M_1st layer) and a first interconnection layer (VIA_1st) layer being referred to correspondingly as M1 and VIA1. In some embodiments, the numbering convention begins with the M_1st layer and the V_1st layer being referred to correspondingly as M0 and VIA0.

Stack 260 further includes: a second metallization layer (M2 layer) 263 over VIA1 layer 262; a second interconnection layer (VIA2 layer) 264 over M2 layer 263; a third metallization layer (M3 layer) 265 over VIA2 layer 264; a third interconnection layer (VIA3 layer) 266 over M3 layer 265; a fourth metallization layer (M4 layer) 267 over VIA3 layer 266; a fourth interconnection layer (VIA4 layer) 268 over M4 layer 267; a fifth metallization layer (M5 layer) 269 over VIA4 layer 268; a fifth interconnection layer (VIA5 layer) 270 over M5 layer 269; a sixth metallization layer (M6 layer) 271 over VIA5 layer 270; and a sixth interconnection layer (VIA6 layer) 272 over M6 layer 271. In some embodiments, substrate 206 is silicon.

In FIG. 2, relative to the Z-axis: VIADG layer 278 has a height H11; M1 layer 261 has a height H14; M2 layer 263, M3 layer 265 and M4 layer 267 each has a height H15; VIA1 layer 262, VIA2 layer 264 and VIA3 layer 266 each has a height of H16; M5 layer 269 and M6 layer 271 each as a height of H20; VIA4 layer 268 and VIA5 layer 270 each has a height of H18; and VIA6 layer 272 has a height of H22. In some embodiments, H15≈1.2*H14. In some embodiments, H16≈1.77*H14. In some embodiments, height H14 is set according to the corresponding design rules of the corresponding semiconductor process technology node.

M1 layer 261 includes M1 segments 228(1) and 228(2) which are electrically conductive. VIA1 layer 262 includes via structures (vias) 230(1) and 230(2) which are electrically conductive and are correspondingly aligned over M1 segments 228(1) and 228(2). Via layer 262 also includes a heater 232, discussed in more detail below. M2 layer 263 includes M2 segments 234(1), 234(2), 234(3) and 234(4) which are electrically conductive, with M2 segments 234(1) and 234(2) being over corresponding vias 230(1) and 230 (2). M2 segments 234(3) and 234(4) are discussed in more detail below.

VIA2 layer 264 includes vias 236(1) and 236(2) which are electrically conductive, and are correspondingly aligned over M1 segments 228(1) and 228(2), and correspondingly aligned over vias 230(1) and 230(2). M3 layer 265 includes M3 segments 238(1) and 238(2) which are electrically conductive and are over corresponding vias 236(1) and 236(2). VIA3 layer 266 includes vias 240(1) and 240(2) which are electrically conductive, and are correspondingly aligned over M3 segments 238(1) and 238(2), and correspondingly aligned over vias 236(1) and 236(2). M4 layer 267 includes M4 segments 242(1) and 242(2) which are electrically conductive and are over corresponding vias 240(1) and 240(2). VIA4 layer 268 includes vias 244(1) and 244(2) which are electrically conductive, and are correspondingly aligned over M4 segments 242(1) and 242(2), and correspondingly aligned over vias 240(1) and 240(2). M5 layer 269 includes M5 segments 246(1) and 246(2) which are electrically conductive and are over corresponding vias 244(1) and 244(2). VIA5 layer 270 includes vias 248(1) and 248(2) which are electrically conductive, and are correspondingly aligned over M5 segments 246(1) and 246(2), and correspondingly aligned over vias 244(1) and 244(2). M6 layer 271 includes M6 segments 250(1) and 250(2) which are electrically conductive and are over corresponding vias 248(1) and 248(2). VIA6 layer 272 includes vias 252(1) and 252(2) which are electrically conductive, and are correspondingly aligned over M6 segments 250(1) and 250(2), and correspondingly aligned over vias 248(1) and 248(2).

Transistor layer 259 includes components of at least one transistor and organized into layers. Transistor layer 259 includes: active region (AR) layer 274; MD and gate (MDG) layer 276 over AR layer 274; and a seventh interconnection layer 278 referred to as VIADG layer 278.

In FIG. 2, within transistor layer 259, AR layer 274 includes active regions 208(1) and 208(2) correspondingly over substrate 206 and a dielectric material 216 serving as a cladding (dielectric 216) filling interstices. In some embodiments, active regions 208(1) and 208(2) are configured corresponding fins according to finFET technology. In some embodiments, active regions 208(1) and 208(2) are configured for planar transistor technology. In some embodiments, active regions 208(1) and 208(2) are configured for a technology other than finFET or planar transistor technologies.

Also within transistor layer 259, MDG layer 276 includes: a gate structure 212 which is electrically conductive and is over AR region 208(1); a contact 214 which is electrically conductive, also known as a metal-over-drain/source-region (MD) contact 214, and is over AR region 208(2); a waveguide 210; and a dielectric material filling interstices.

Also within transistor layer 259, VIADG layer 278 includes: a via structure 224, also known as via-over-gate (VG) 224, over gate structure 212; an via structure 223, also known as via-over-drain/source-region (VD) 223, which is electrically conductive and is over MD contact 214; and an interlayer dielectric (ILD) material 226(1) (ILD 226(1) filling interstices. With respect to the upper surface of rib portion 220 (discussed below) of waveguide 210, ILD 226(1) serving as a cladding. In some embodiments, dielectric 216 and ILD 226(1) are formed of corresponding materials having corresponding indices of refraction substantially different than an index of refraction of waveguide 210 so as to facilitate substantial, if not total, internal reflection within waveguide 210. In some embodiments. waveguide 210 is optically anisotropic. In some embodiments, at least a to-be-heated (TBH) portion of waveguide 210 is thermo-optic effective (TOE). electro-optic effective (EOE). In some embodiments, at least the TBH portion of waveguide 210 is electro-optic effective (EOE). In some embodiments, at least the TBH portion of waveguide 210 is TOE and EOE. In some embodiments, waveguide 210 includes silicon. In some embodiments, waveguide 210 includes silicon nitride (SiN). In some embodiments, waveguide 210 includes lithium niobate (LiNbO3). In some embodiments, waveguide 210 includes gallium arsenide (GaAs). In some embodiments, waveguide 210 includes indium phosphide (InP). In some embodiments, dielectric 216 and ILD are optically isotropic. In some embodiments, dielectric 216 is silicon dioxide ($SiO_2$). In some embodiments, ILD 226(1) is silicon dioxide ($SiO_2$).

In FIG. 2, waveguide 210 is a rib waveguide and includes a slab portion 218 and rib portion 220 on slab portion 218. The long axis, also known as the major axis, of at least the to-be-heated (TBH) portion of waveguide 210 extends substantially parallel to the Y-axis. MDG layer 276 is organized into layers. MDG layer 276 includes a first waveguide layer (WG1 layer) 280 and a second waveguide layer (WG2 layer) 282. Slab portion 218 is in WG1 layer 280. Rib portion 220 is in WG2 layer 282.

Relative to the X-axis: AR region 208(1) and gate structure 212 and MD contact 214 are displaced from waveguide 210, as indicated by the break in FIG. 2 denoted by break-symbol 215(1); and AR region 208(2) and MD contact 214 are displaced from waveguide 210, as indicated by the break in FIG. 2 denoted by break-symbol 215(2).

In FIG. 2, relative to the X-axis, rib portion 220 of waveguide 210 has a width W02. Relative to the X-axis, rib portion 220 is substantially centered over slab portion 218 of waveguide 210. End portions of slab portion 218 each have a width W03 such that slab portion 218 has a width W$\Sigma$=W02+2*W03. Relative to the Z-axis, waveguide 210 has a height H02, slab portion 218 has a height H06 and rib portion 220 has a height H08. Waveguide 210 is located a height H04 above substrate 206. In some embodiments, relative to a unit of distance d, W02 is in a range ($\approx$450d)$\leq$W02$\leq$($\approx$500d), W$\Sigma$ is in a range ($\approx$4450d)$\leq$W$\Sigma\leq$($\approx$4500d), H02$\approx$270d, H06$\approx$130d, H08$\approx$440d and H04$\approx$2000d. In some embodiments in which W02$\approx$500d and W$\Sigma\approx$4500d, then W$\Sigma\leq$($\approx$8.9)*W02. In some embodiments, W02$\approx$370d, W03$\approx$2000d and WZ$\approx$370d. In some embodiments, d=1 nanometer (nm). In some embodiments, W02 is in a range ($\approx$370d)$\leq$W02$\leq$($\approx$500d). In some embodiments, a ratio W02/W03 is in a range ($\approx$0.185)$\leq$(W02/W03)$\leq$($\approx$0.250).

As noted, VIA1 layer 262 further includes heater 232. In some embodiments, heater 232 is located in VIADG layer 278. In some embodiments, heater 232 is located in one of VIA2 layer 264, VIA3 layer 266, VIA4 layer 268, VIA5 layer 270 or VIA6 layer 272. The difficulty of regulating the amount of heat delivered from heater 232 to waveguide 210 is directly proportional to distance H04. As distance H04 increases, the difficulty of regulating the amount of heat delivered from heater 232 to waveguide 210 increases. In some embodiments, heater 232 includes tantalum nitride (TaN). In some embodiments, heater 232 includes copper (Cu). In some embodiments, heater 232 includes titanium (Ti) nitride (TiN). In some embodiments, heater 232 include a combination of TiN and Ti.

In some embodiments, the heater includes tantalum nitride, (TaN), titanium nitride (TiN) or a combination including TaN and TiN. According to another approach, a heater for heating a waveguide included chromium (Cr) and/or gold (Au), which have corresponding higher resistivities than either Cr or Au. Relative to a given heat output of the heater of the other approach, according to at least some embodiments, an advantage of using TaN, TiN or a combination including TaN and TiN is that the heater is smaller and/or consumes less power. In some embodiments, TaN has a sheet resistance, RS, where RS$\approx$100 $\Omega$/square. An advantage of a heater which includes TaN and has RS$\approx$100

Ω/square, according to some embodiments, is that such a heater has about 100 times greater sheet resistance than the heater according to the other approach.

In FIG. 2, relative to the Z-axis and the X-axis, heater 232 correspondingly has a height H12 and a width W04. Heater 232 is disposed a height H10 above rib portion 220 of waveguide 210. In some embodiments, W04≈WZ. In some embodiments, W04>(≈8.9)*W02. In some embodiments, relative to the unit of distance d, H12≈120d, W04≈4450d and H10 falls in a range (≈320d)≤H10≤(≈3,180,000d). In some embodiments, H10≈60,000d. In some embodiments, a ratio W02/W04 is in a range (≈0.083)≤(W02/WZ)≤(≈0.111).

Also as noted, M1 layer 263 includes M2 segments 234(3) and 234(4). In FIG. 2, relative to the X-axis, M2 segments 234(3) and 234(4) are disposed over, and are electrically coupled with, opposite sides of heater 232. In some embodiments, M2 segments 234(3) and 234(4) represent corresponding terminals of heater 232. As heater 232 is a resistive heater, also known as an Ohmic heater, M2 segments 234(3) and 234(4) are parts of corresponding electrically conductive paths which provide corresponding input and output currents, or vice-versa, to heater 232. In FIG. 2, heater 232 is shown as having a rectangular cross-section. In some embodiments, the cross-section of heater 232 is a shape other than rectangular.

Together, waveguide 210 and heater 232 comprise heating arrangement 204. In some embodiments, heating arrangement 204 further includes M2 segments 234(3) and 234(4). Depending upon the corresponding configuration, the heating arrangement is used to selectively shift phase delay, change refractive index, shift wavelength range, modulate amplitude, or the like.

Figure 3B:
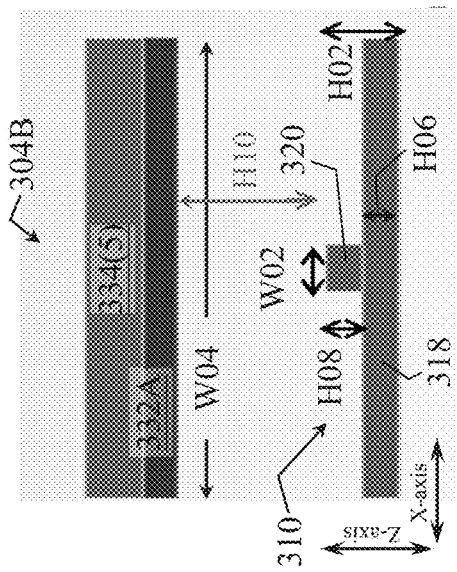
FIGS. 3B-3D are corresponding cross-sections, in accordance with some embodiments.
Figure 3D:
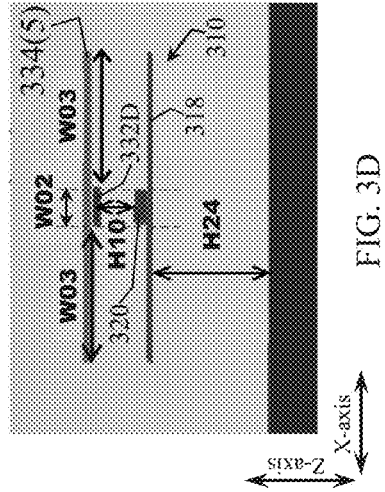
Figure 3A:
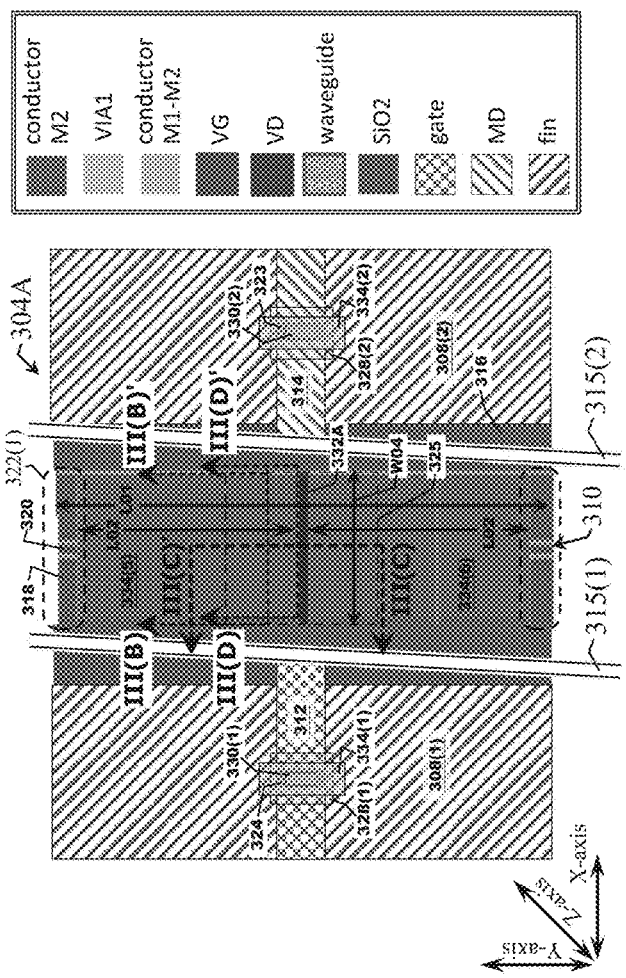
FIG. 3A is a layout diagram, in accordance with some embodiments.

FIG. 3A is a layout diagram 304A of a heating arrangement, in accordance with some embodiments. In some embodiments, FIG. 3A assumes a Cartesian coordinate system, with the horizontal direction being the X-axis and the vertical direction being the Y-axis.

Figure 3C:
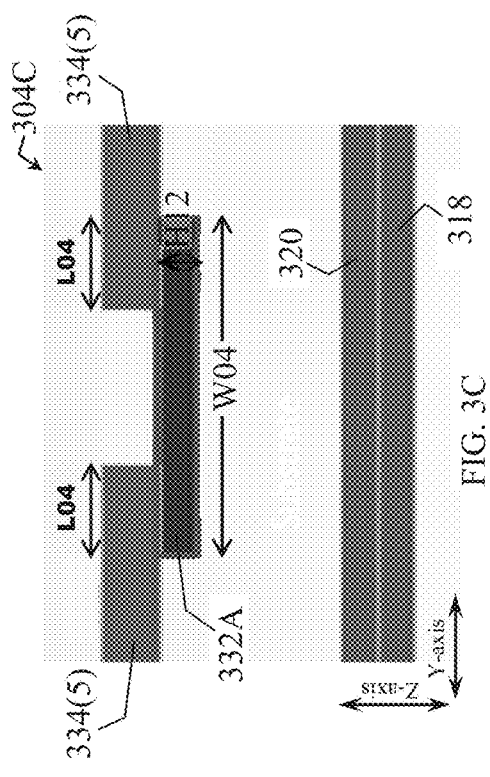

FIGS. 3B-3C are corresponding cross-sections 304B-304C of a heating arrangement corresponding to layout diagram 304A of FIG. 3A, in accordance with some embodiments. FIG. 3B corresponds to sectional line III(B)-III(B)' of FIG. 3A. FIG. 3C corresponds to sectional line III(C)-III(C)' of FIG. 3A. In some embodiments, FIG. 3B assumes a Cartesian coordinate system, with the horizontal direction being the X-axis and the vertical direction being the Z-axis. In some embodiments, FIG. 3C assumes a Cartesian coordinate system, with the horizontal direction being the Y-axis and the vertical direction being the Z-axis.

FIG. 3D is a cross-section 304D of a heating arrangement representing a variation of the heating arrangement corresponding to layout diagram 304A of FIG. 3A, in accordance with some embodiments. FIG. 3D corresponds to sectional line III(D)-III(D)' of FIG. 3A. In some embodiments, FIG. 3D assumes a Cartesian coordinate system, with the horizontal direction being the X-axis and the vertical direction being the Z-axis.

Layout diagram 304A of FIG. 3A and cross-sections 304B of corresponding FIGS. 3B-3D follow a numbering convention similar to that of cross-section of FIG. 2. To help identify components which correspond but nevertheless have differences, the numbering convention of FIGS. 3A-3D uses 3-series numbers whereas FIG. 2 uses 2-series numbers. Furthermore, the numbering convention of FIGS. 3A-3D appends a suffix to an element number to indicate the corresponding figure. For example, heater pattern 332A in FIG. 3A, heater 332A in FIGS. 3B-3C and heater 332D in FIG. 3D correspond. For brevity, the discussion will focus more on differences between FIG. 3A and FIG. 2 than on similarities.

In FIG. 3A, layout diagram 304A includes: in an AR level AR and an MDG level corresponding to AR layer 274 and MDG layer 376, a dielectric pattern 316; in the AR level, active region (AR) patterns 308(1) and 308(2) adjacent corresponding left and right sides of dielectric pattern 316; in a WG1 level corresponding to WG1 layer 280, a slab pattern 318 over dielectric pattern 316; in a WG2 level corresponding to WG2 layer 282, a rib pattern 320 over slab pattern 318, where slab pattern 318 and rib pattern 320 together represent a waveguide pattern 310; in the MDG level, a gate pattern 312 over AR pattern 308(1) and to the left side of dielectric pattern 316; in the MDG level, an MD pattern 314 over AR pattern 308(2) and the right side of dielectric pattern 316; in a VIADG level corresponding to VDG layer 278, a VD pattern 323 over MD pattern 314; in the VIADG level, a VG pattern 324 over gate pattern 312; in an M1 level corresponding to M1 layer 261, M1 patterns 328(1) and 328(2) correspondingly over VG pattern 324 and VD pattern 323; in a VIA1 level corresponding to VIA1 layer 262, via patterns 330(1) and 330(2) over corresponding M1 patterns 328(1) and 328(2); in the VIA1 level, a heater pattern 332A over waveguide pattern 310; and in an M2 level corresponding to M2 layer 263, M2 patterns 334(1) and 334(2) over corresponding via patterns 330(1) and 330(2); and in the M2 level, M2 patterns 334(5) and 334(6) over heater pattern 332A. In some embodiments, taken together, the WG_1st level and the WG_2nd level represent the MDG level of FIG. 3, which corresponds to MDG layer 276 of FIG. 2.

In some embodiments, M2 patterns 334(5) and 334(6) represent terminal patterns for heater pattern 332A, and so have a corresponding relationship with M2 segments 234(3) and 234(4) of FIG. 2.

In FIG. 3A, M2 patterns 334(5) and 334(6) include corresponding phantom portions 322(1) and 322(2). Relative to the Y-axis, to permit visibility of slab pattern 318 and rib pattern 320, M2 patterns 334(5) and 334(6) are retracted from the top and bottom of layout diagram 304A, as indicated by corresponding phantom portions 322(1) and 322(2).

In FIG. 3A, relative to the Y-axis, each of slab pattern 318 and rib pattern 320 has a length L01. In some embodiments, relative to the unit of distance d, L01 is 200,000d. Each of M2 patterns 334(5) and 334(6) has a length L02. In some embodiments, relative to the unit of distance d, L02 has a minimum value of L02≤(≈4000d).

Relative to the X-axis, each of heater pattern 332A and M2 patterns 334(5) and 334(6) has a width substantially equal to W04.

In some embodiments, relative to the X-axis and Y-axis, heater pattern 332A has a substantially rectangular shape/footprint. In some embodiments, heater patterns 332 has a substantially square shape. In some embodiments, a length, LTHB, of to-be-heated (TBH) portion of waveguide pattern 310 is LTHB W04.

Relative to FIG. 3A, FIGS. 3B-3C show corresponding slab portion 318, rib portion 320, heater 332A and M2 segment 334(5). FIG. 3C additionally shows corresponding M2 segment 334(4).

In FIG. 3D, again, cross-section 304D is of a heating arrangement representing a variation of the heating arrangement corresponding to layout diagram 304A of FIG. 3A. Relative to FIG. 3A, FIG. 3D shows corresponding slab portion 318, rib portion 318, heater 332D and M2 segment 334(5). In FIG. 3D, relative to the X-axis, heater 332D has a width approximately equal to W2.

FIGS. 4A-4G are corresponding layout diagrams, in accordance with some embodiments.

Figure 4B:
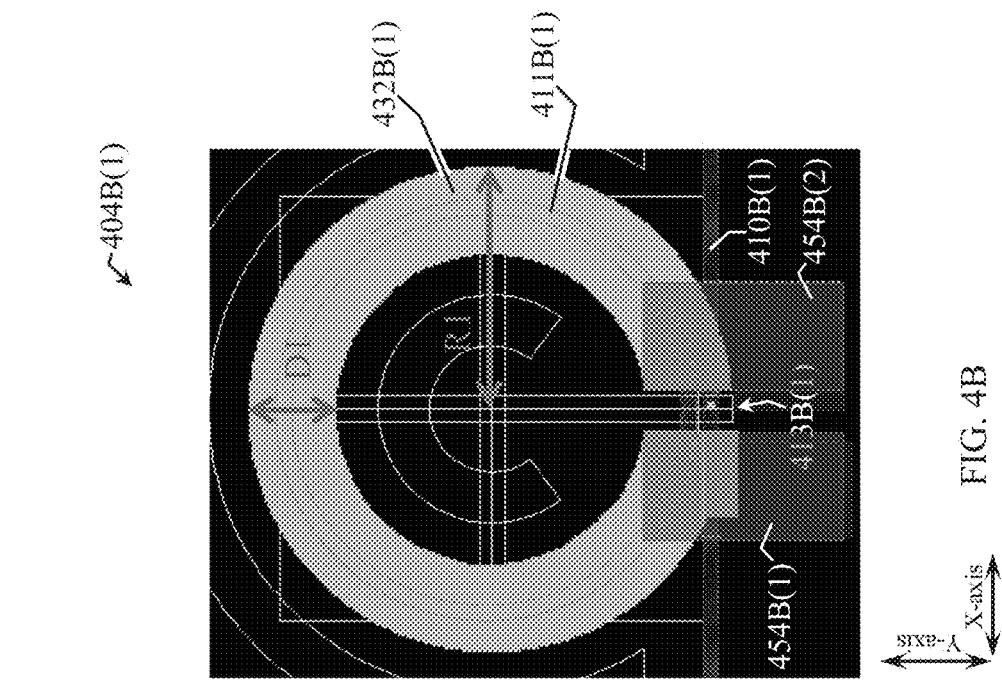
FIGS. 4A-4G are corresponding layout diagrams, in accordance with some embodiments.
Figure 4A:
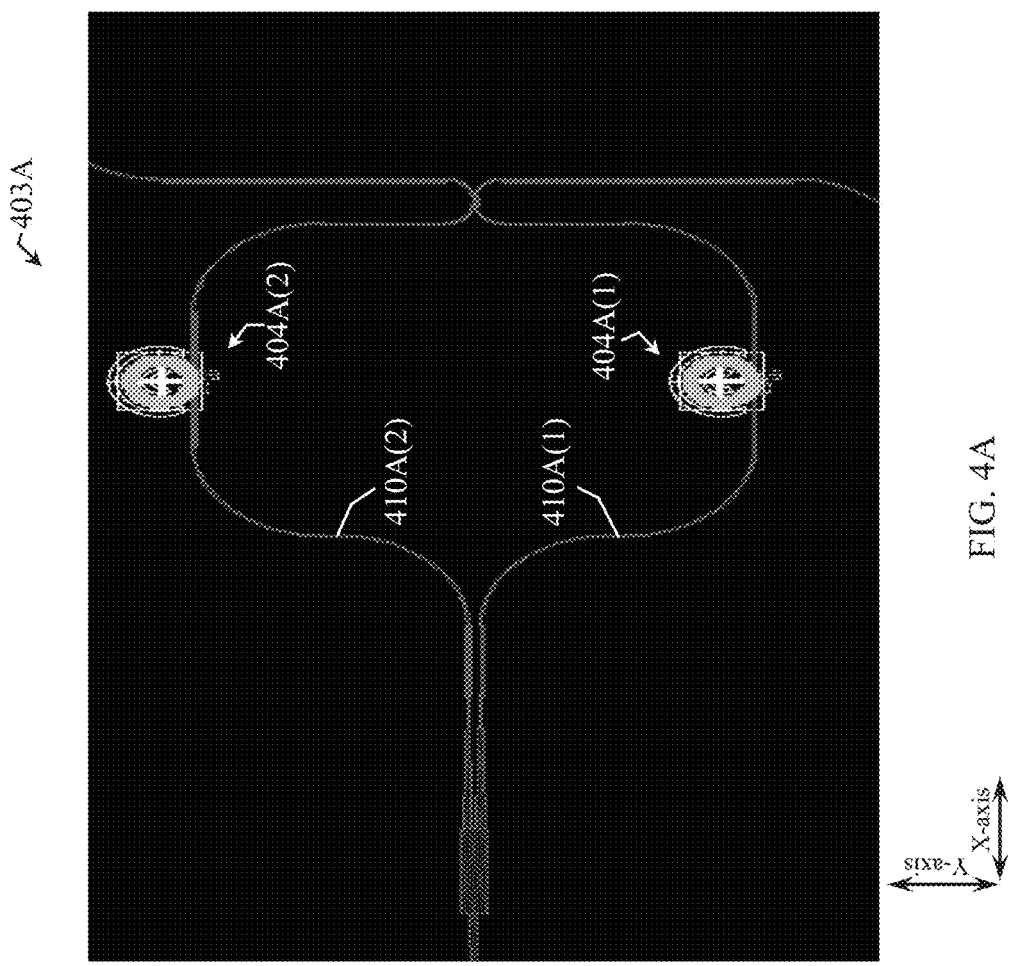

More particularly regarding FIG. 4A, it is a layout diagram 403A of a waveguide arrangement which includes waveguide patterns 410A(1) and 410A(2), and corresponding heating arrangements 404A(1) and 404A(2). In some embodiments, waveguide patterns 410A(1) and 410A(2) represent corresponding rib waveguides. Waveguide arrangement 403A is a double ring modulator arrangement. Each of heating arrangements 404A(1) and 404A(2) is a ring modulator arrangement.

More particularly regarding FIG. 4B, it is a layout diagram 404B(1) of heating arrangement 404A(1) of FIG. 4A. Heating arrangement 404B(1) includes: a ring waveguide pattern 411B(1) which is ring-shaped; a heater pattern 432B(1) which is ring-shaped; and conductive patterns 454B(1) and 454B(2) which overlie corresponding ends of heater pattern 432B(1) and which represent corresponding electrically conductive terminals of a heater represented by heater pattern 432B(1). In some embodiments, ring waveguide pattern 411B(1) represents a rib waveguide. In some embodiments, conductive patterns 454B(1) and 454B(2) are patterns in a metallization level, e.g., M2 patterns. To prevent a short circuit scenario, a gap 413B(1) is provided in the circumference of heater pattern 432B(1). A radius R1 and a diameter D1 of heater pattern 432B(1) are sized so that heater pattern 432B at least substantially overlaps ring waveguide pattern 411B(1). In some embodiments, radius R1 and diameter D1 are sized so that heater pattern 432B overlaps at least about 80% of ring waveguide pattern 411B(1). In some embodiments, relative to the unit of distance d, R1 falls in a range $(\approx 0d) \leq R1 \leq (\approx 10{,}000d)$.

Figure 4D:
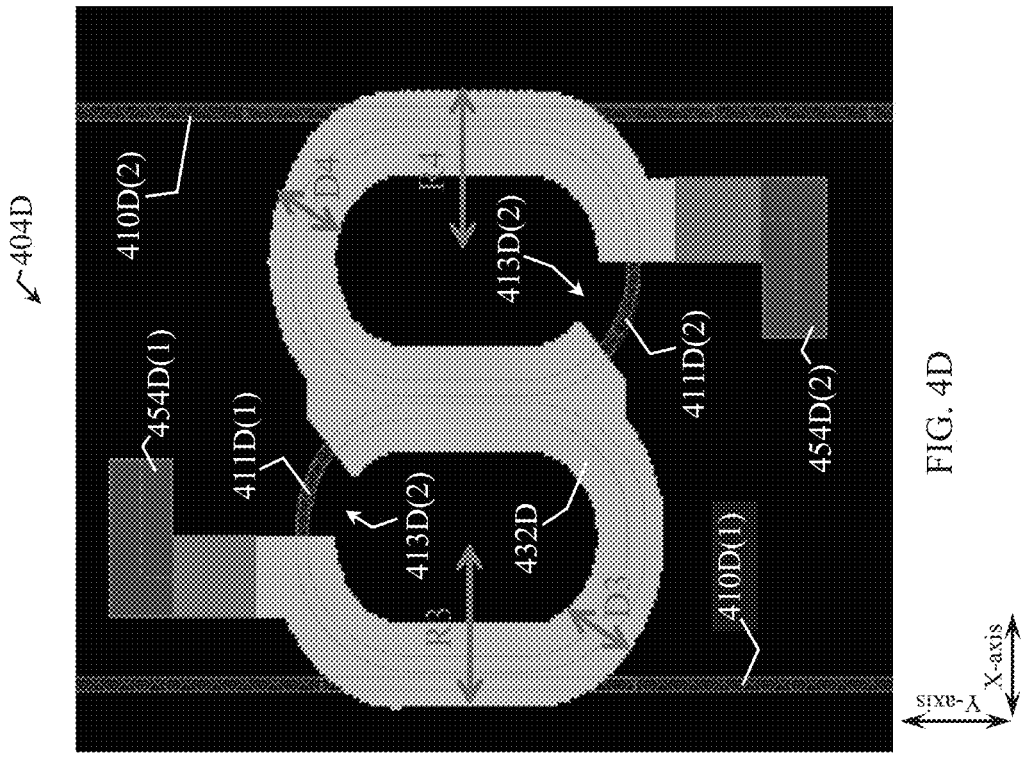
Figure 4C:
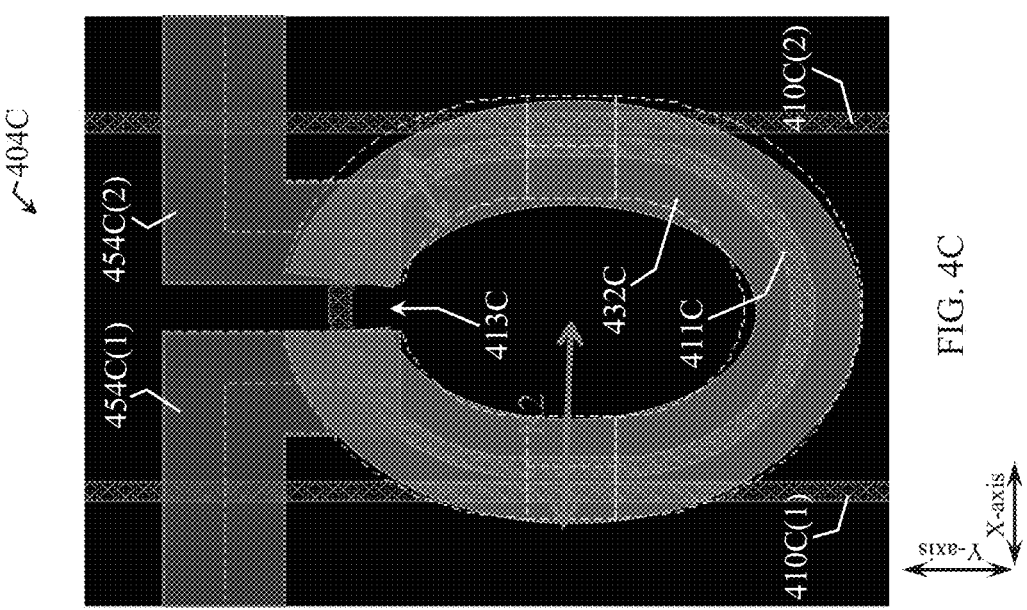

More particularly regarding FIG. 4C, it is a layout diagram 404C of a heating arrangement which includes: waveguide patterns 410C(1) and 410C(2); a ring waveguide pattern 411C which is ring-shaped; a ring-shaped heater pattern 432C; and conductive patterns 454C(1) and 454C(2) which overlie corresponding ends of heater pattern 432C and which represent corresponding electrically conductive terminals of a heater represented by heater pattern 432C. In some embodiments, waveguide patterns 410C(1) and 410C(2) and ring waveguide pattern 411C represent corresponding rib waveguides. In some embodiments, conductive patterns 454C(1) and 454C(2) are patterns in a metallization level, e.g., M2 patterns. The heating arrangement of layout diagram 404C represents a ring filter.

To prevent a short circuit scenario, a gap 413C is provided in the circumference of heater pattern 413C. A radius R2 and a diameter D2 of heater pattern 432C are sized so that heater pattern 432C at least substantially overlaps ring waveguide pattern 411A. In some embodiments, radius R2 and diameter D2 are sized so that heater pattern 413C overlaps at least about 80% of ring waveguide pattern 411A. In some embodiments, relative to the unit of distance d, R1 falls in a range $(\approx 0d) \leq R1 \leq (\approx 10{,}000d)$.

More particularly regarding FIG. 4D, it is a layout diagram 404D of a heating arrangement which includes: waveguide patterns 410D(1) and 410d(2); ring waveguide patterns 411D(1) and 411D(2), each of which is ring-shaped; a heater pattern 432D; and conductive patterns 454D(1) and 454D(2) which overlie corresponding ends of heater pattern 432D and which represent corresponding electrically conductive terminals of a heater represented by heater pattern 432D. In some embodiments, waveguide patterns 410D(1) and 410D(2) and ring waveguide patterns 411d(1) and 411D(2) represent corresponding rib waveguides. In some embodiments, conductive patterns 454D(1) and 454D(2) are patterns in a metallization level, e.g., M2 patterns. The shape of heater pattern 432D can be described as figure-eight-like, letter-S-like, or as first and second heater patterns each of which is ring-shaped, and wherein the first and second heater patterns are abutted relative to the X-axis. The heating arrangement of layout diagram 404D represents a double ring filter.

To prevent a short circuit scenario, gaps 413D(1) and 413D(1) are provided in the arcuate portions of heater pattern 413C. The locations of gaps 413D(1) and 413D(1) give rise to the letter-S-like description of the shape of heater pattern 432D. Radii R3 and R4 and diameters D3 and D4 of heater pattern 432D are sized so that heater pattern 432D at least substantially overlaps ring waveguide patterns 411D(1) and 411D(2). In some embodiments, radii R3 and R4 and diameters D3 and D4 are sized so that heater pattern 432D overlaps at least about 80% of ring waveguide pattern 411A. In some embodiments, relative to the unit of distance d, R1 falls in a range $(\approx 0d) \leq R1 \leq (\approx 10{,}000d)$.

Figure 4E:
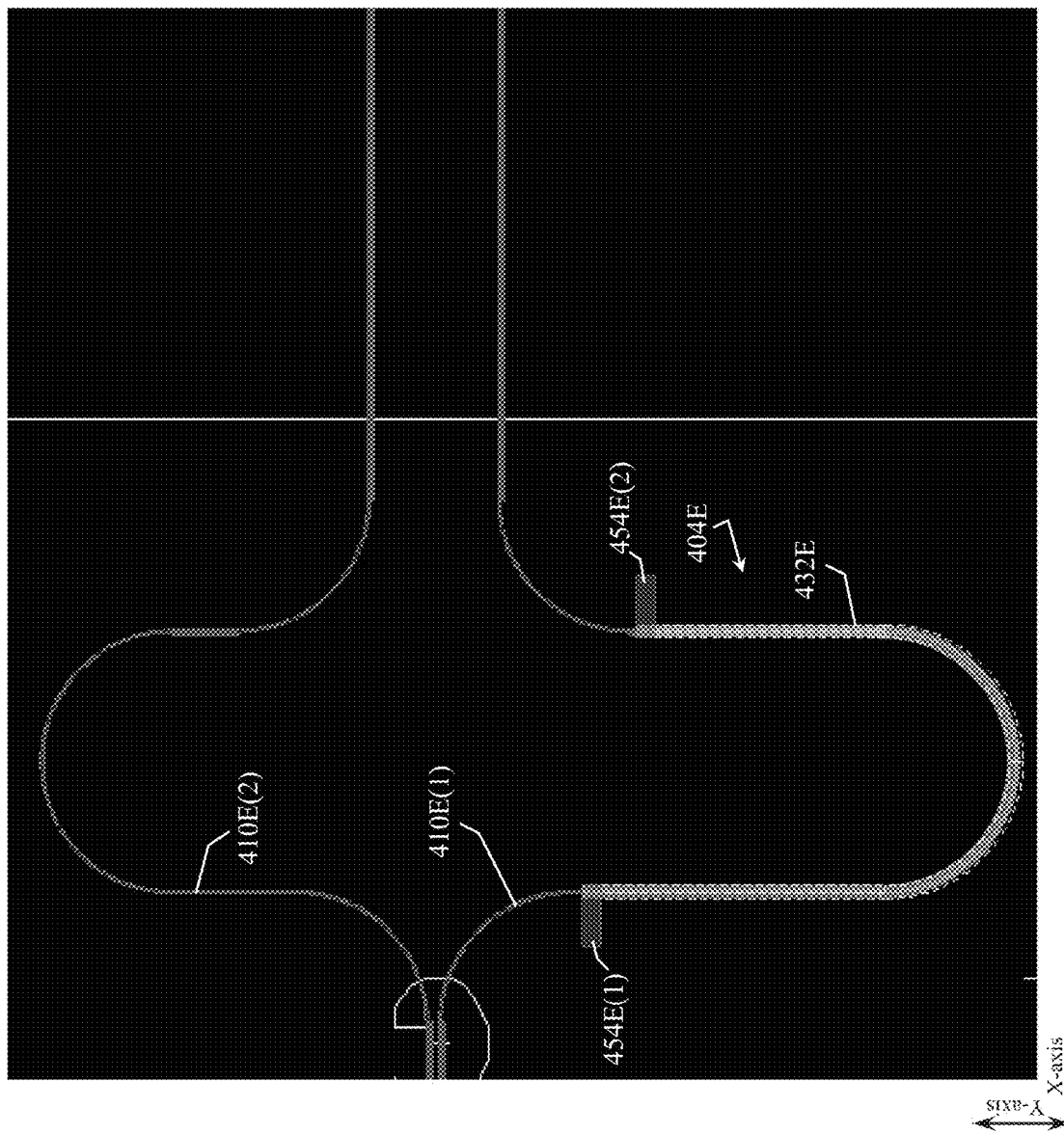

More particularly regarding FIG. 4E, it is a layout diagram 403E of a waveguide arrangement which includes waveguide patterns 410E(1) and 410E(2), and a heating arrangement 404E. Waveguide arrangement 403E is a traveling-wave (TW) Mach-Zehnder modulator (MZM) arrangement (TWMZM arrangement), which is a higher speed type of MZM arrangement. Heating arrangement 404E includes: a U-shaped heater pattern 432E overlying a corresponding U-shaped portion of waveguide pattern 410E(1); and conductive patterns 454E(1) and 454E(2) which overlie corresponding ends of heater pattern 432E and which represent corresponding electrically conductive terminals of a heater represented by heater pattern 432E. In some embodiments, waveguide patterns 410D(1) and 410D(2) represent corresponding rib waveguides. In some embodiments, conductive patterns 454E(1) and 454E(2) are patterns in a metallization level, e.g., M2 patterns.

Figure 4F:
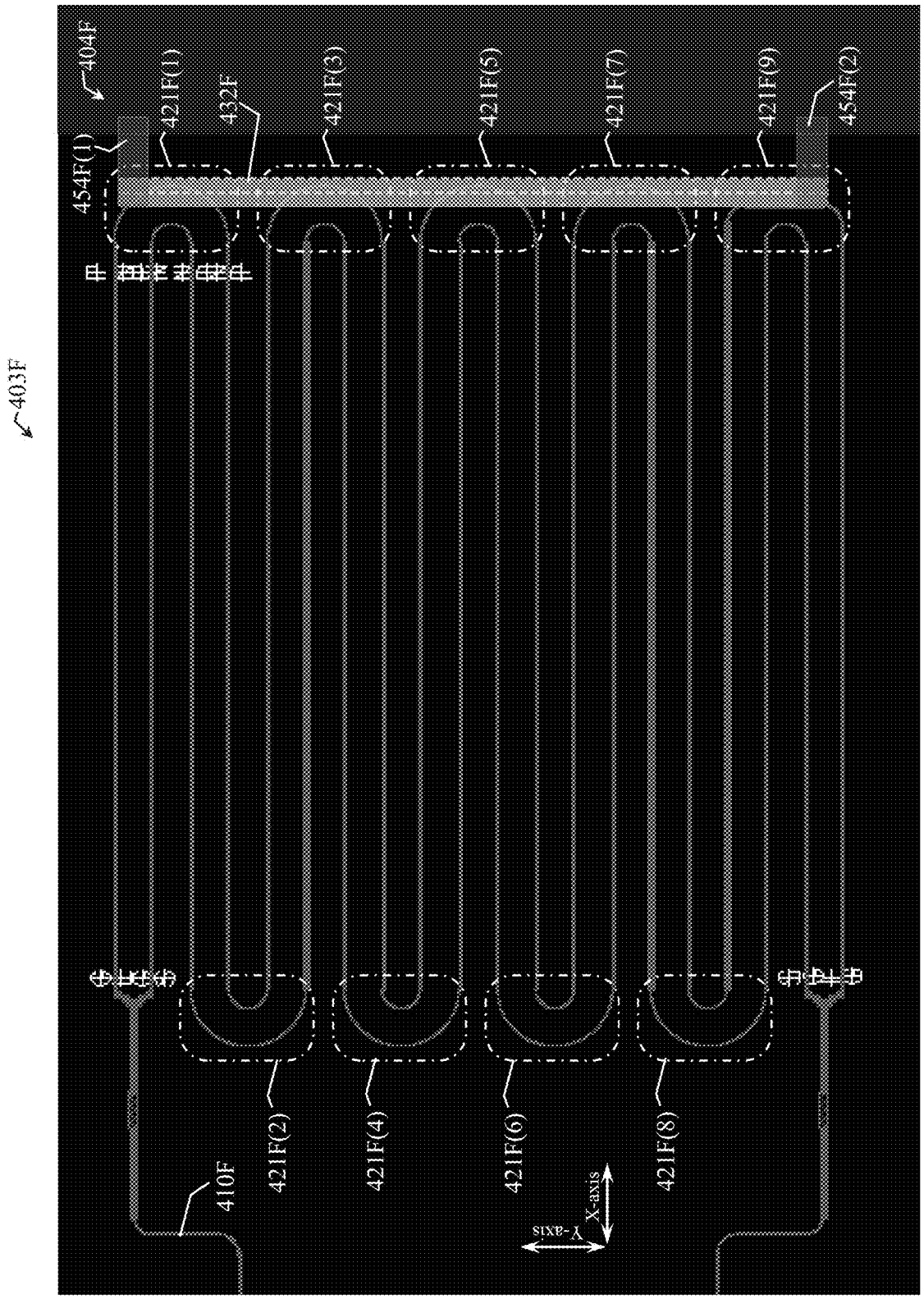

More particularly regarding FIG. 4F, it is a layout diagram 403F of a waveguide arrangement which includes a waveguide pattern 410F and a rectangular heating arrangement 404F. Waveguide arrangement 403F is a higher speed type of Mach-Zehnder modulator (MZM) arrangement. Waveguide pattern 403F includes U-shaped portions 421F(1), 421F(2), 421F(3), 421F(4), 421F(5), 421F(6), 421F(7), 421F(8) and 421F(9).

Heating arrangement 404F includes: a heater pattern 432E overlying corresponding U-shaped portions 421F(1), 421F(3), 421F(5), 421F(7) and 421F(9) of waveguide pattern 410E(1); and conductive patterns 454F(1) and 454F(2) which overlie corresponding ends of heater pattern 432F and which represent corresponding electrically conductive terminals of a heater represented by heater pattern 432F. In some embodiments, conductive patterns 454F(1) and 454F(2) are patterns in a metallization level, e.g., M2 patterns.

Figure 4G:
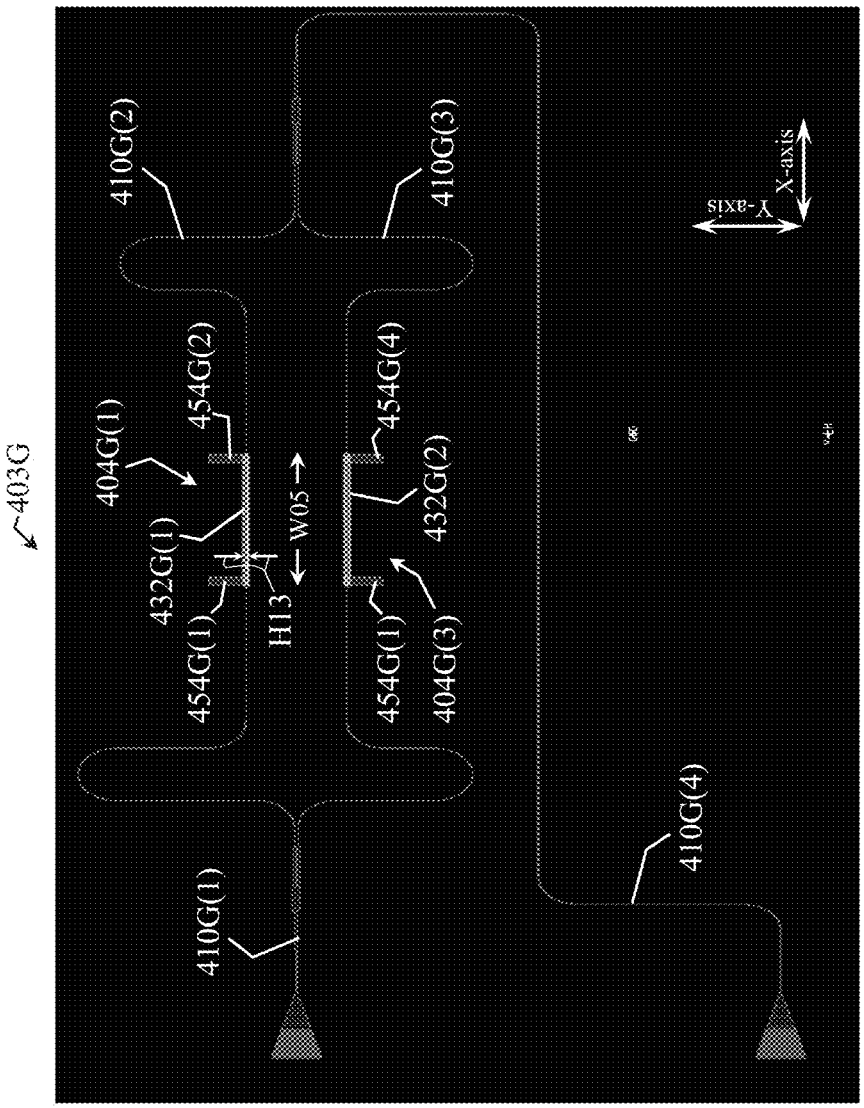

More particularly regarding FIG. 4G, it is a layout diagram 403G of a waveguide arrangement which includes waveguide patterns 410G(1), 410G(2), 410G(3) and 410G(4), and corresponding heating arrangements 404G(1) and 404G(2). Waveguide arrangement 403G is a thermal waveguide arrangement. Heating arrangement 404G(1) includes: a rectangular heater pattern 432B(1) which overlies a corresponding portion of waveguide 410G(2); and conductive patterns 454G(1) and 454G(2) which overlie corresponding ends of heater pattern 432G(1) and which represent corresponding electrically conductive terminals of a heater represented by heater pattern 432G(1). Heating arrangement 404G(2) includes: a rectangular heater pattern 432G(2) which overlies a corresponding portion of waveguide 410G (3); and conductive patterns 454G(3) and 454G(4) which overlie corresponding ends of heater pattern 432G(2) and which represent corresponding electrically conductive terminals of a heater represented by heater pattern 432G(2). In some embodiments, waveguide pattern 410F) is a rib waveguide. In some embodiments, conductive patterns 454G(1)-454G(4) are patterns in a metallization level, e.g., M2 patterns. Each of heater patterns 432G(1) and 432G(2) is sized to least substantially overlap the corresponding to-be-heated (TBH) portion of waveguide patterns 410G(2) and 410G(3). In some embodiments, relative to the X-axis and the unit of distance d, each of heater patterns 432G(1) and 432G(2) has a width, W04, which falls in a range ($\approx$0d) $\leq$W04$\leq$($\approx$500,000d). In some embodiments, relative to the Y-axis and the unit of distance d, each of heater patterns 432G(1) and 432G(2) has a height, H13, which falls in a range ($\approx$0d)$\leq$H13$\leq$($\approx$5,000d).

Figure 5A:
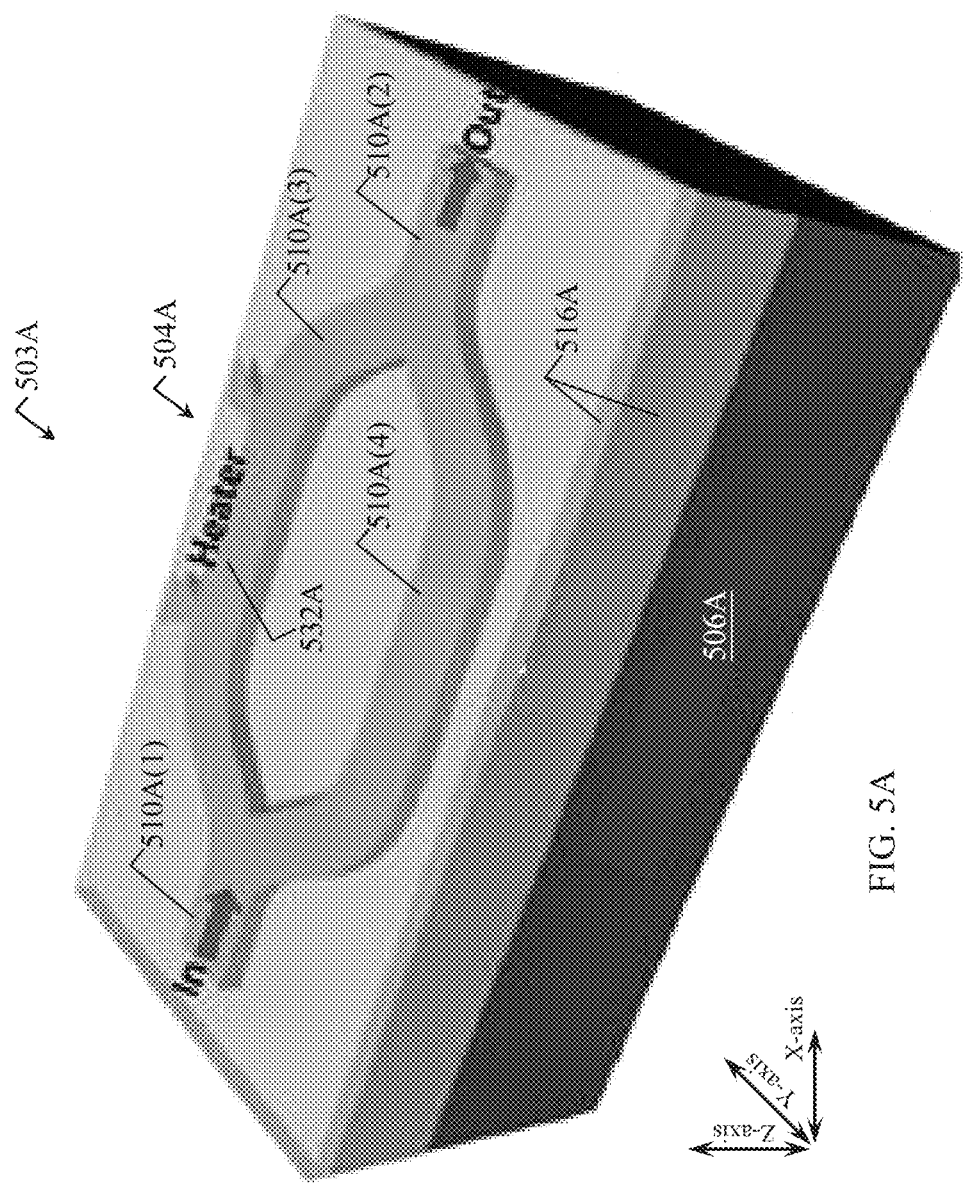
FIG. 5A is a three-quarter perspective view diagram, in accordance with some embodiments.

FIG. 5A is a three-quarter perspective view diagram of a waveguide arrangement 503A, in accordance with some embodiments.

In FIG. 5A, waveguide arrangement 503A includes: a substrate 506A; a dielectric material 516A (dielectric 516A); and waveguides 510A(1), 510A(2), 510A(3) and 510A(4), and a heating arrangement 504A. Waveguide arrangement 503A is a Mach-Zehnder modulator (MZM) arrangement 503A. Heating arrangement 504A includes a heater 532A overlying a corresponding portion of waveguide 510A(2). In some embodiments, waveguide 510A(1) represents an input of MZM arrangement 503A, and waveguide 510A(2) represents an output of MZM arrangement 503A.

Figure 5B:
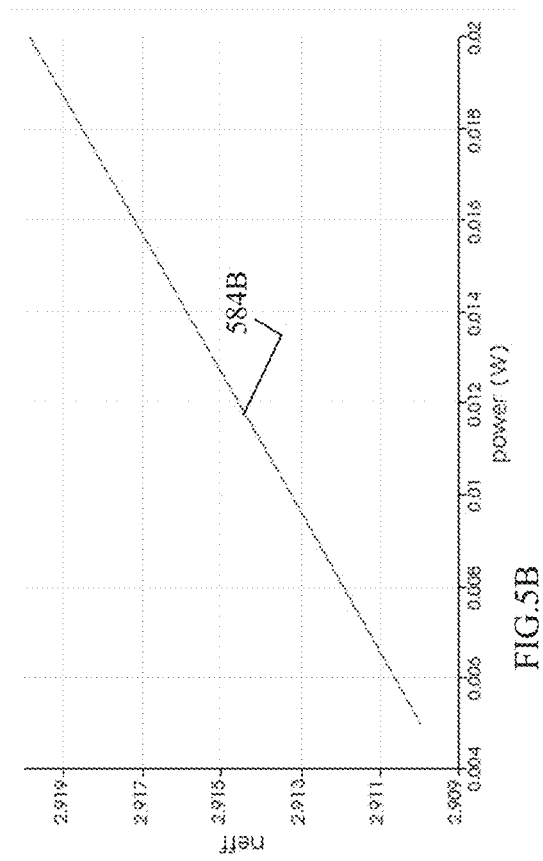
FIGS. 5B, 5C and 5D are corresponding two-dimensional plots, in accordance with some embodiments.
Figure 5D:
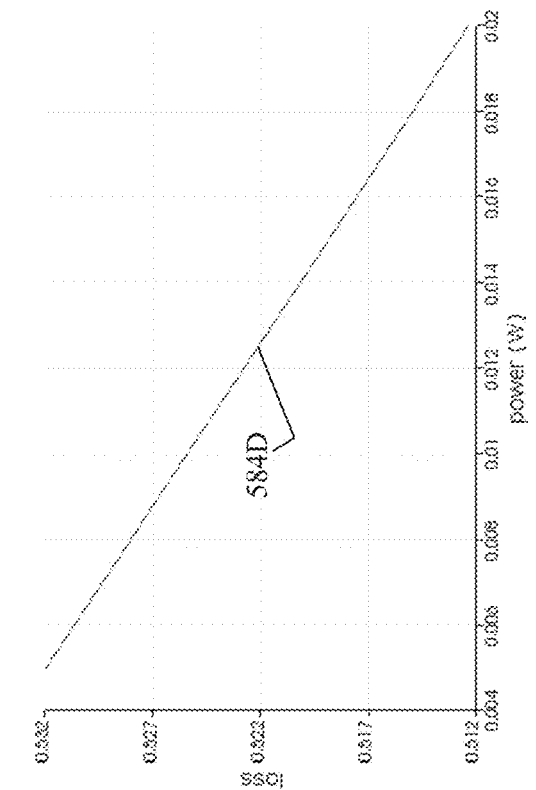
Figure 5C:
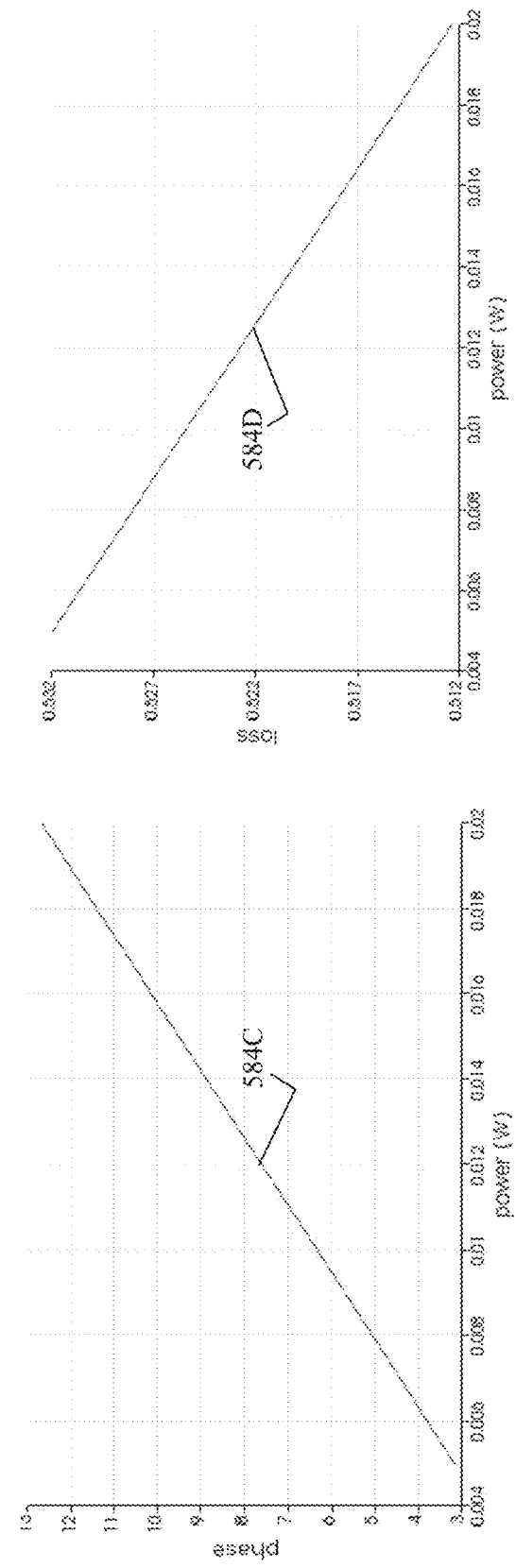

FIGS. 5B, 5C and 5D are corresponding two-dimensional plots 584B, 584C and 584D of corresponding relationships, in accordance with some embodiments.

In FIG. 5B, plot 584B is based on a simulated example implementation of heating arrangement 504A of FIG. 5A. Plot 548B represents a relationship between power (in units of watts, W) on the X-axis and effective index of refraction, neff) on the Y-axis, for a to-be-heated (TBH) portion of waveguide 510H(3) underneath heater 532H in FIG. 5A. Plot 584B represents a positive, substantially linear relationship.

In FIG. 5C, plot 584C is based on a simulated example implementation of heating arrangement 504A of FIG. 5A. Plot 548B represents a relationship between power (in units of watts, W) on the X-axis and phase shift (in units of radians) on the Y-axis, for a to-be-heated (TBH) portion of waveguide 510H(3) underneath heater 532H in FIG. 5A. Plot 584C represents a positive, substantially linear relationship.

In FIG. 5D, plot 584D is based on a simulated example implementation of heating arrangement 504A of FIG. 5A. Plot 548D represents a relationship between power (in units of watts, W) on the X-axis and loss/attenuation on the Y-axis, for a to-be-heated (TBH) portion of waveguide 510H(3) underneath heater 532H in FIG. 5A. Plot 584C represents a negative, substantially linear relationship.

Figure 5E:
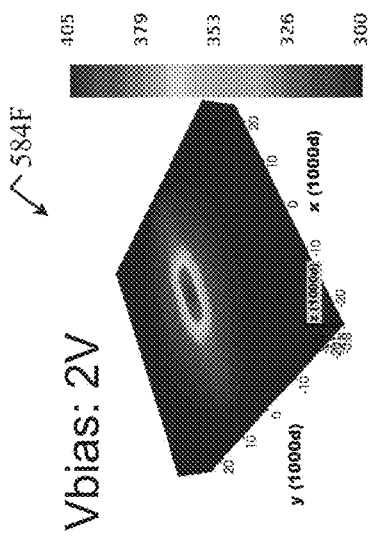
FIGS. 5E, 5F and 5G are corresponding three-dimensional plots, in accordance with some embodiments.
Figure 5F:
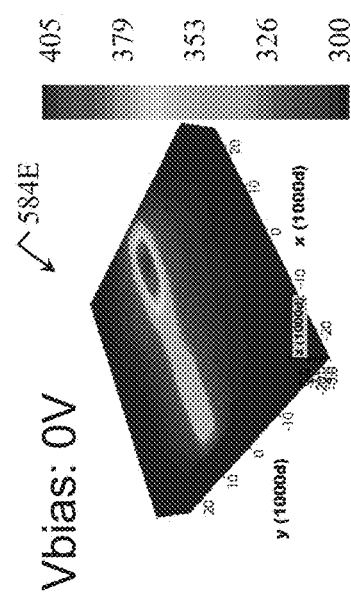
Figure 5H:
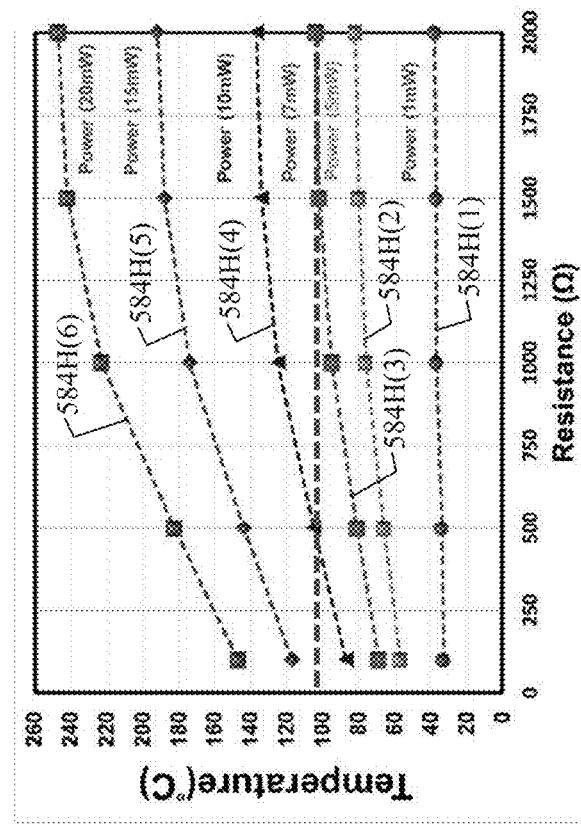
FIG. 5H is a two-dimensional plot of multiple waveforms, in accordance with some embodiments.
Figure 5G:
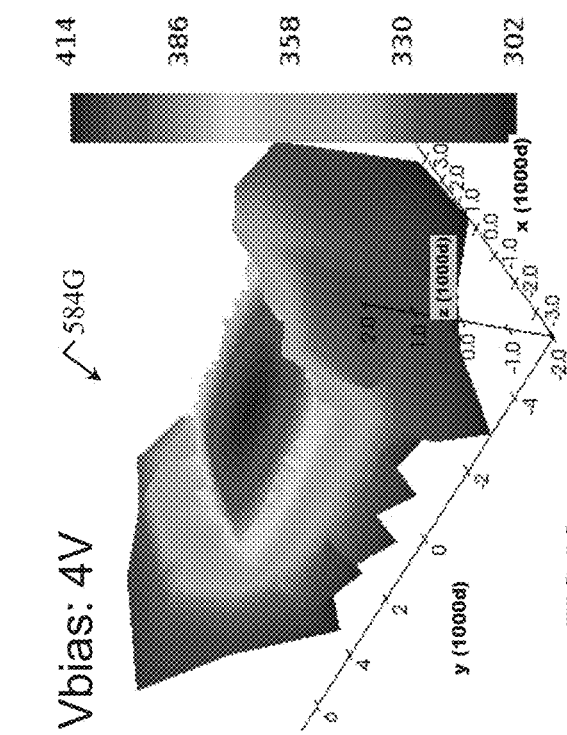

FIGS. 5E, 5F and 5G are corresponding three-dimensional plots 584E, 584F and 584G of corresponding relationships, in accordance with some embodiments.

Each of plots 584E, 584F and 584G is based on a simulated example implementation of heating arrangement 504A of FIG. 5A. Each of plots 584E, 584F and 584G represents a corresponding distribution of temperature (in units of degrees Celsius) relative to distance from heater 532 of FIG. 5A, with each of the X-axis, Y-axis and Z-axis representing distance in units of d (discussed above). In FIG. 5E, plot 584E represents a bias of about zero (0) volts applied to heater 532A. In FIG. 5F, plot 584F represents a bias of 2 volts applied to heater 532A. In FIG. 5G, according to some embodiments, plot 584G represents a bias of 4 volts applied to heater 532A.

FIG. 5H is a two-dimensional plot of multiple waveforms 584H(1), 584H(2), 584H(3), 584H(4), 584H(5) and 548H(6) of corresponding relationships, in accordance with some embodiments.

Each of waveforms 584H(1), 584H(2), 584H(3), 584H (4), 584H(5) and 548H(6) is based on a simulated example implementation of heating arrangement 504A of FIG. 5A. Each of waveforms 584H(1), 584H(2), 584H(3), 584H(4), 584H(5) and 548H(6) represents a relationship between resistance (in units of ohms, $\Omega$) on the X-axis and temperature (in units of degrees Celsius) on the Y-axis for heater 532H in FIG. 5A. More particularly, each of waveforms 584H(1), 584H(2), 584H(3), 584H(4), 584H(5) and 548H(6) is based on a corresponding amount of power (in units of milliwatts, mW) provided to heater 532H.

Figure 6A:
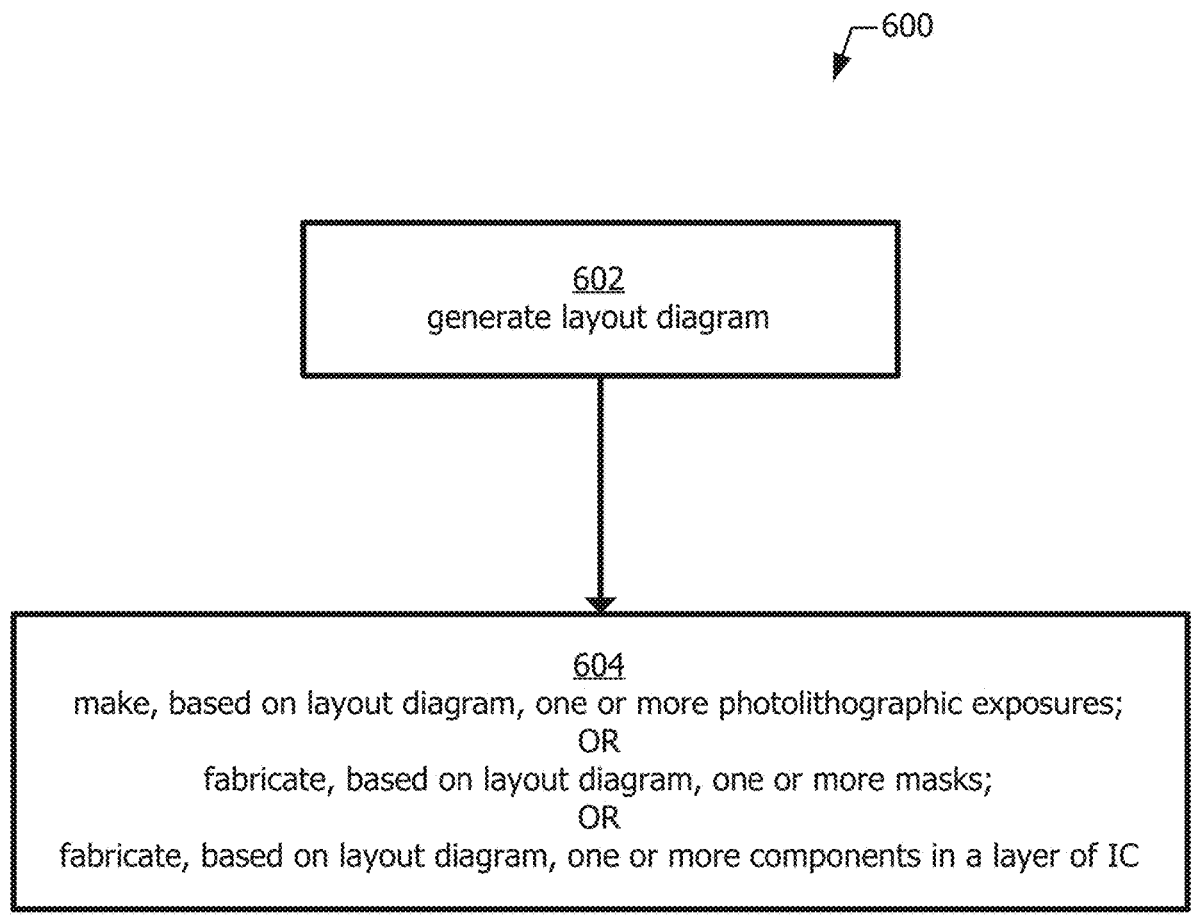
FIG. 6A is a flowchart of a method of manufacturing a semiconductor device, in accordance with some embodiments.

FIG. 6A is a flowchart of a method 600 of generating a layout diagram, in accordance with some embodiments.

Method 600 is implementable, for example, using EDA system 700 (FIG. 7, discussed below) and an integrated circuit (IC), manufacturing system 800 (FIG. 8, discussed below), in accordance with some embodiments. Regarding method 500, examples of the layout diagram include layout diagram 304A of FIG. 3A, or the like. Examples of a semiconductor device which can be manufactured according to method 500 include semiconductor device 100 FIG. 1.

In FIG. 6A, method 600 includes blocks 602-604. At block 602, a layout diagram is generated which, among other things, includes a heating arrangement for a waveguide arrangement as in, e.g., FIGS. 3A and 4A-4H. An example of a semiconductor device corresponding to a layout generated by method 600 includes semiconductor device 100 of FIG. 1. Block 602 is implementable, for example, using EDA system 700 (FIG. 7, discussed below), in accordance with some embodiments. Regarding block 602, examples of the layout diagrams which are generated according to block 602 include the layout diagrams of FIGS. 3A and 4A-4H, or the like. Examples of a semiconductor device which can be manufactured based on layout diagrams generated according to block 602 include semiconductor device 100 FIG. 1, semiconductor devices including the cross-sections of FIGS. 3B-3D, semiconductor devices based on the layout diagrams of FIGS. 3A and 4A-4H, or the like. Block 602 is discussed in more detail below with respect to FIG. 6B. From block 602, flow proceeds to block 604.

At block 604, based on the layout diagram, at least one of (A) one or more photolithographic exposures are made or (B) one or more semiconductor masks are fabricated or (C) one or more components in a layer of a semiconductor device are fabricated. See discussion below of FIG. 8.

Figure 6B:
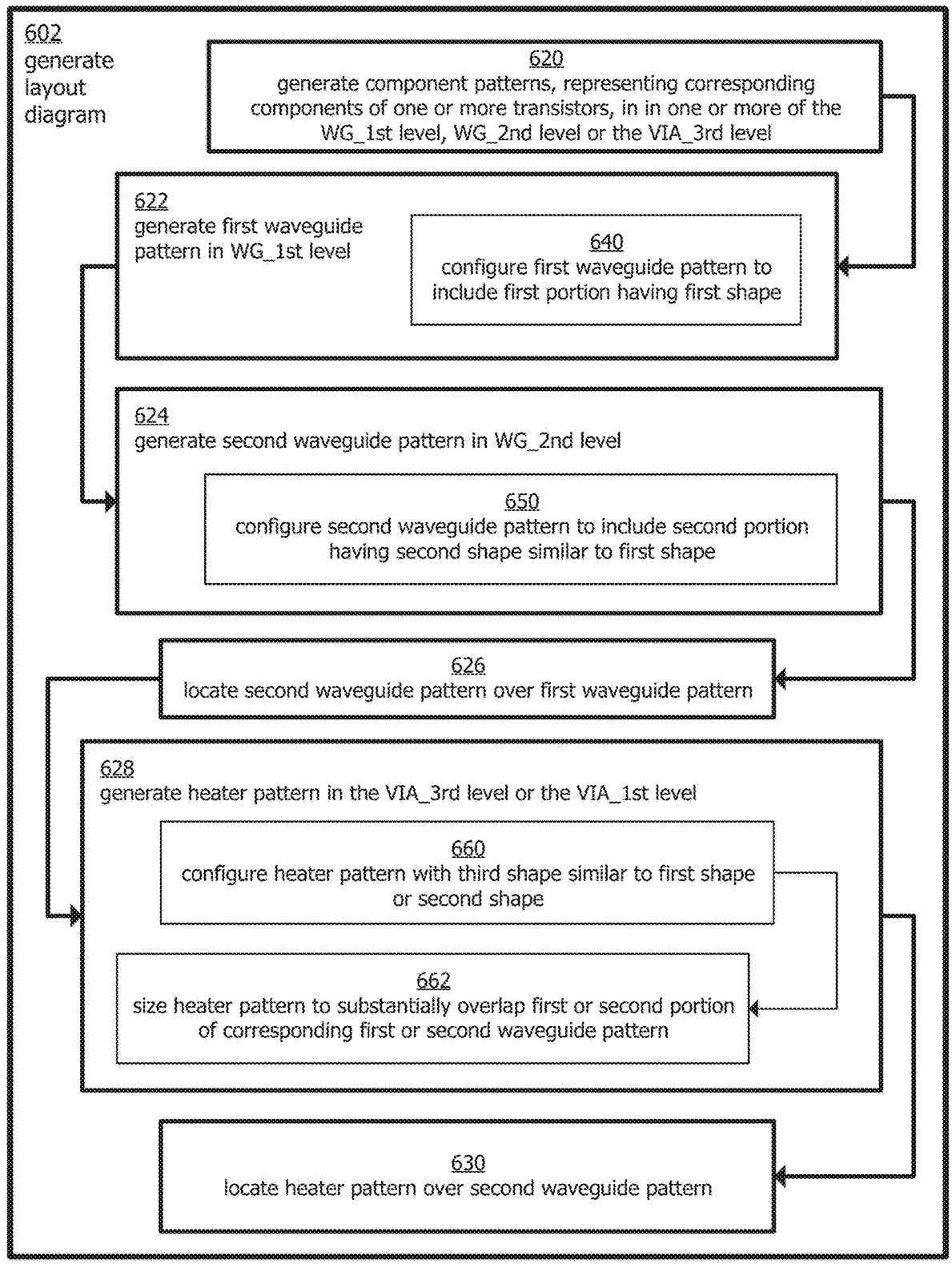
FIG. 6B is a flowchart of a method of generating a layout diagram, in accordance with some embodiments.

FIG. 6B is a flowchart of a method of generating a layout diagram, in accordance with some embodiments.

More particularly, the flowchart of FIG. 6B shows additional blocks included in block 602 of FIG. 6A, in accordance with one or more embodiments. Block 602 includes blocks 620-630.

In FIG. 6B, at block 620, component patterns in one or more of the WG_1st, WG_2nd or VIA_3rd level are generated. The component patterns represent components of one or more transistors. An example of the WG_1st level is the WG1 level of FIG. 3A, which corresponds to WG1 layer

280 in FIG. 2. An example of the WG_2nd level is the WG2 level of FIG. 3A, which corresponds to WG2 layer 282 in FIG. 2. An example of the VIA_3rd level is the VIADG level of FIG. 3A, which corresponds to VDG layer 278 in FIG. 2. In some embodiments, taken together, the WG_1st level and the WG_2nd level represent the MDG level of FIG. 3A, which corresponds to MDG layer 276 of FIG. 2. Examples of the component patterns include gate pattern 312 and MD pattern 314 in the MDG level, VD pattern 323 and VG pattern 324 in the VIADG level, or the like. From block 620, flow proceeds to block 622.

At block 622, a first waveguide pattern is generated in the WG_1st level. An example of the first waveguide pattern is slab pattern 318 of FIG. 3A. Block 622 includes block 640. At block 640, the first waveguide pattern is configured to include a first portion having a first shape. Recalling that waveguide patterns 410E(1) and 410E(2) represent corresponding rib waveguides in some embodiments, an example of the first portion of the first waveguide pattern having a first shape is the U-shaped portion of waveguide pattern 410E(1) of FIG. 4E, which underlies U-shaped heater pattern 432E. From block 622, flow proceeds to block 624.

At block 624, a second waveguide pattern is generated in the WG_2nd level. An example of the second waveguide pattern is rib pattern 320 of FIG. 3A. Block 624 includes block 650. At block 650, the second waveguide pattern is configured to include a second portion having a second shape similar to the first shape. Recalling that waveguide patterns 410E(1) and 410E(2) represent corresponding rib waveguides in some embodiments, an example of the second portion of the second waveguide pattern having a second shape similar to the first shape is the U-shaped portion of waveguide pattern 410E(1) of FIG. 4E, which underlies U-shaped heater pattern 432E. From block 624, flow proceeds to block 626.

At block 626, the second waveguide pattern is located over the first waveguide pattern. An example of the second waveguide pattern being located over the first waveguide pattern is rib pattern rib pattern 320, which is located over slab pattern 318. From block 626, flow proceeds to block 628.

At block 628, a heater pattern is generated in the VIA_3rd level or in the VIA_1st level. An example of the VIA_3rd level is the VIADG level representing VIADG layer 278 in FIG. 2. An example of the VIA_1st level is the VIA1 level representing VIA1 layer 262 in FIG. 2. An example of the heater pattern in the VIA_3rd level or in the VIA_1st level is heater pattern 332A, which is in the VIA_1st level of FIG. 3A. Heater pattern 332A represents heater 232 in FIG. 2, which is in VIA1 layer 262.

Block 628 includes blocks 660-662. At block 660, the heater pattern is configured with a third shape similar to the first and second shapes correspondingly of the first and second portions of the corresponding first and second waveguide patterns.

An example of the heater pattern being configured with a third shape similar to the first and second shapes is heater pattern 432E of FIG. 4E, which has a U-shape similar to the U-shaped portion of waveguide pattern 410E(1) which underlies U-shaped heater pattern 432E. From block 660, flow proceeds to block 662.

At block 62, the heater pattern is sized to substantially overlap the first or second portion of the corresponding first or second waveguide pattern. An example of the heater pattern being sized to substantially overlap the first or second portion of the corresponding first or second waveguide pattern is heater pattern 432E of FIG. 4E. In some embodiments, the heater pattern is sized to overlaps at least about 80% of the first or second portion of the corresponding first or second waveguide pattern. From block 662, flow proceeds to block 664.

At block 664, the heater pattern is located over the second waveguide pattern. An example of the heater pattern being located over the second waveguide pattern is heater pattern 332A being located over rib pattern 320 in FIG. 3A.

Figure 7:
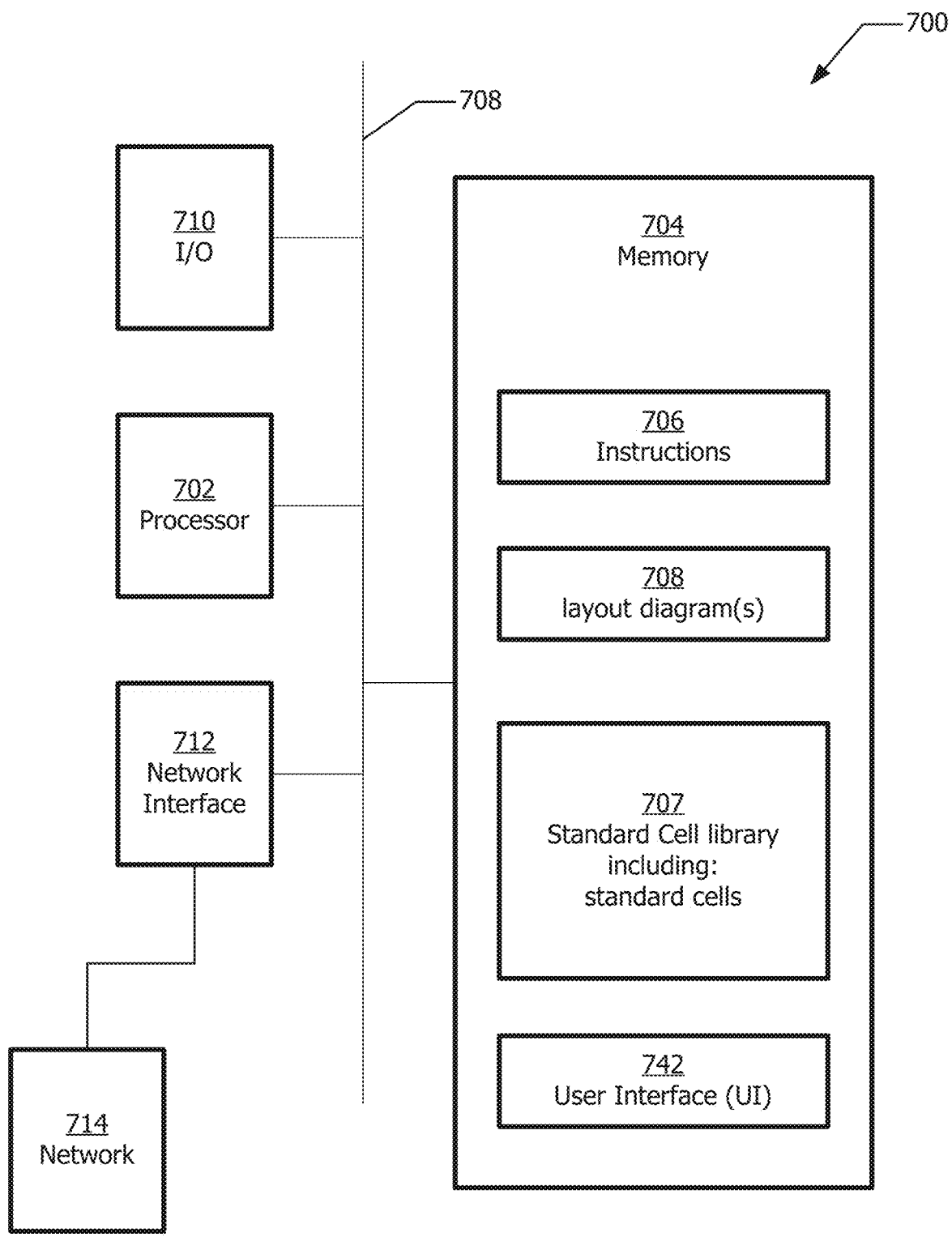
FIG. 7 is a block diagram of an electronic design automation (EDA) system in accordance with some embodiments.

FIG. 7 is a block diagram of an electronic design automation (EDA) EDA system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, where computer program code 706 is a set of computer-executable instructions. Execution of computer program code 706 by processor 702 represents (at least in part) an EDA tool which implements a portion or all of, e.g., the methods described herein in accordance with one or more corresponding embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause EDA system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause EDA system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells corresponding to cells disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
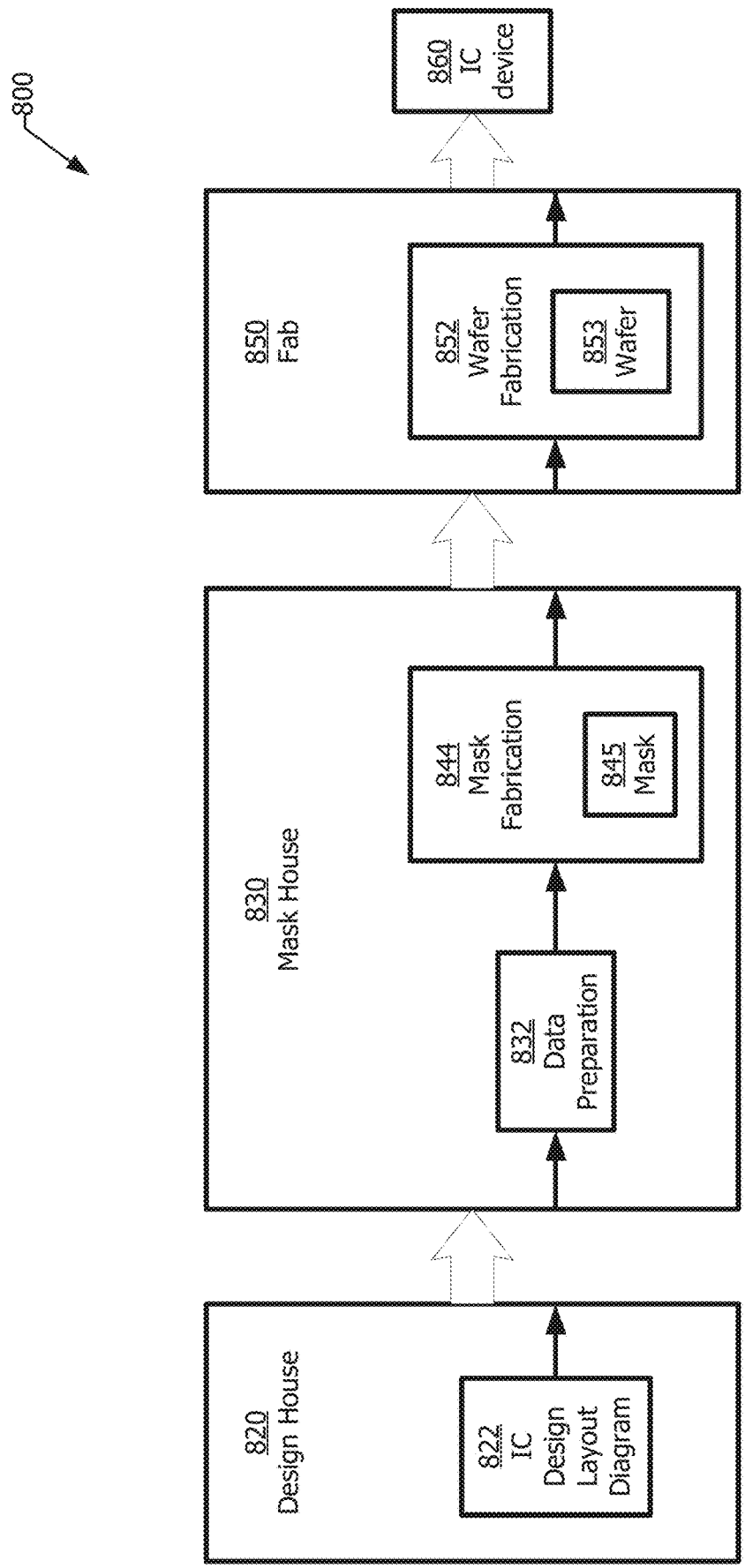
FIG. 8 is a block diagram of a semiconductor device manufacturing system, and an IC manufacturing flow associated therewith, in accordance with some embodiments.

FIG. 8 is a block diagram of semiconductor device, e.g., an integrated circuit (IC), manufacturing system 800, and an IC manufacturing flow associated therewith, in accordance with some embodiments.

In some embodiments, based on a layout diagram, e.g., one or more of the layout diagrams disclosed herein in accordance with one or more corresponding embodiments, or the like, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

In an embodiment, a semiconductor device includes: a transistor layer including components of at least one transistor, a waveguide having a long axis extending in a first direction, and an alpha interconnection layer over the waveguide; a stack of metallization layers over the transistor layer, the stack including one or more beta interconnection layers interposed between corresponding pairs of neighboring ones of the metallization layers; and a heater in the alpha interconnection layer or in one of the one or more beta interconnection layers; and wherein, relative to a second direction substantially perpendicular to the first direction, the heater substantially overlaps at least a portion of the waveguide. In an embodiment, the waveguide is a rib waveguide. In an embodiment, relative to a third direction substantially perpendicular to each of the first and second directions, the rib waveguide includes a slab portion and a rib portion stacked on the slab portion; relative to the second direction, the rib portion has a width, Wr; relative to the second direction, end portions of the slab portion are not overlapped by the rib portion and have a width, We; and a ratio Wr/We is in a range of (≈0.185)≤(Wr/We)≤(≈0.25). In an embodiment, relative to the second direction, the slab portion has a width, Ws; a ratio Wr/Ws is in a range of (≈0.083)≤(Wr/Ws)≤(≈0.111). In an embodiment, relative to the width of the rib portion in the second direction, and relative to a height of the rib portion in the third direction, the rib portion has a substantially square shape. In an embodiment, relative to the second direction, a width of the heater is substantially the same as the width of the slab portion. In an embodiment, the stack of metallization layers further includes a first metallization layer (M_1st layer) over the transistor layer, and a second metallization layer (M_2nd layer) over the M_1st layer; and the one or more beta interconnection layers includes a first beta interconnection layer between the M_1st layer and the M_2nd layer; and the heater is in the alpha interconnection layer or the first beta interconnection layer. In an embodiment, the heater is in the first beta interconnection layer. In an embodiment, relative to the first and second directions, the heater has a substantially square shape. In an embodiment, relative to a third direction substantially perpendicular to each of the first and second directions, the rib waveguide includes: a slab portion: and a rib portion stacked on the slab portion; relative to the second direction, the rib portion has a width, Wr; relative to the second direction, the heater has a width, Wh; and a ratio Wr/Wh is in a range of (≈0.083)≤(Wr/Wh)≤ (≈0.25). In an embodiment, the heater includes TaN, TiN or a combination including TaN and TiN. In an embodiment, relative to the first and second directions, the waveguide has a first portion having a first shape, and the heater has a second shape which is similar to the first shape; and the second shape is sized to overlap at least about 80% of the first portion. In an embodiment, the first shape of the first portion of the waveguide is a ring resonator and the second shape of the heater is a ring-like shape; or the first shape of the first portion of the waveguide is a double-ring resonator and the second shape of the heater is a figure-eight-like shape; or the first shape of the first portion of the waveguide is a U-shape and the second shape of the heater is a U-shape. In an embodiment, relative to the first and second directions, the waveguide has a first plurality of U-shaped portions and a second plurality of U-shaped portions; and each U-shaped portion includes an arcuate portion; the heater is rectangular; and the heater overlaps the arcuate portions of the first plurality of U-shaped portions of the waveguide.

In an embodiment, a method of manufacturing a semiconductor device, in a context of a layout diagram stored on a non-transitory computer-readable medium and including a transistor level, a first level of metallization (M_1st level), a first level of interconnection (VIA_1st level) and a second level of metallization (M_2nd level) representing correspondingly a transistor layer, a first layer of metallization (M_1st layer), a first layer of interconnection (VIA_1st layer) and a second layer of metallization (M_2nd layer) in the semiconductor device, the transistor level including a first waveguide level (WG_1st level), a second waveguide level (WG_2nd level) and a third level of interconnection (VIA_3rd level) representing correspondingly a first waveguide layer (WG_1st layer), a second waveguide layer (WG_2nd layer) and a third layer of interconnection (VIA_3rd layer), the method including generating the layout diagram, the latter including: generating component patterns correspondingly in one or more of the WG_1st level, WG_2nd level or the VIA_3rd level representing corresponding components of one or more transistors; generating a first waveguide pattern in the WG_1st level; generating a second waveguide pattern in the WG_2nd level; locating the second waveguide pattern over the first waveguide pattern; generating a heater pattern in the VIA_3rd level or the VIA_1st level; and locating the heater pattern over the second waveguide pattern. In an embodiment, the method further includes, based on the layout diagram, at least one of: (A) making one or more photolithographic exposure; (B) fabricating one or more semiconductor masks; or (C) fabricating at least one component in a layer of a semiconductor integrated circuit. In an embodiment, the generating a first waveguide pattern in the WG_1st level includes configuring the first waveguide pattern to include a first portion having a first shape; the generating a second waveguide pattern in the WG_2nd level includes configuring the second waveguide pattern to include a second portion having a second shape similar to the first shape; the generating a heater pattern in the VIA_3rd level or the VIA_1st level includes configuring the heater pattern with a third shape which is similar to the first shape or the second shape, and sizing the heater pattern to substantially overlap the first or second portion of the corresponding first or second waveguide pattern; and the locating the heater pattern over the second waveguide pattern includes locating the heater pattern over the second portion of the first waveguide pattern. In an embodiment, the heater pattern is generated in the VIA_1st level.

In an embodiment, a system for manufacturing a semiconductor device includes at least one processor and at least one memory including computer program code for one or more programs; in a context of a layout diagram stored on a non-transitory computer-readable medium and including a transistor level, a first level of metallization (M_1st level), a first level of interconnection (VIA_1st level) and a second level of metallization (M_2nd level) representing correspondingly a transistor layer, a first layer of metallization (M_1st layer), a first layer of interconnection (VIA_1st layer) and a second layer of metallization (M_2nd layer) in the semiconductor device, the transistor level including a first waveguide level (WG_1st level), a second waveguide level (WG_2nd level) and a third level of interconnection (VIA_3rd level) representing correspondingly a first waveguide layer (WG_1st layer), a second waveguide layer (WG_2nd layer) and a third layer of interconnection (VIA_3rd layer), such that in the context the at least one memory, the computer program code and the at least one processor are configured to cause the system to execute a method which includes generating the layout diagram, the latter including: generating component patterns correspondingly in one or more of the WG_1st level, WG_2nd level or the VIA_3rd level representing corresponding components of one or more transistors; generating a first waveguide pattern in the WG_1st level; configuring the first waveguide pattern to include a first portion having a first shape; generating a second waveguide pattern in the WG_2nd level; configuring the second waveguide pattern to include a second portion having a second shape substantially similar to the first shape; locating the second waveguide pattern over the first waveguide pattern; generating a heater pattern in the VIA_3rd level or the VIA_1st level; configuring the heater pattern with a third shape which is similar to the first and second shapes; sizing the third shape to overlap at least about 80% of the first portion of the first waveguide pattern; and locating the heater pattern over the second waveguide pattern.

In an embodiment, the system further includes at least one of: a masking facility configured to fabricate one or more semiconductor masks based on based on the layout diagram;

or a fabricating facility configured to fabricate at least one component in a layer of a semiconductor integrated circuit based on the layout diagram.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
   a transistor layer including:
      components of at least one transistor;
      a waveguide having a long axis extending in a first direction; and
   an alpha interconnection layer over the waveguide;
   a stack of metallization layers over the transistor layer, the stack of metallization layers including one or more beta interconnection layers interposed between corresponding pairs of neighboring ones of the metallization layers; and
   a heater in the alpha interconnection layer or in one of the one or more beta interconnection layers; and
   wherein, relative to a second direction substantially perpendicular to the first direction, the heater substantially overlaps at least a portion of the waveguide.

2. The semiconductor device of claim 1, wherein:
   the waveguide is a rib waveguide.

3. The semiconductor device of claim 2, wherein:
   relative to a third direction substantially perpendicular to each of the first and second directions, the rib waveguide includes:
      a slab portion: and
      a rib portion stacked on the slab portion;
   relative to the second direction, the rib portion has a width, Wr;
   relative to the second direction, end portions of the slab portion are not overlapped by the rib portion and have a width, We; and
   a ratio Wr/We is in a range of (≈0.185)≤(Wr/We)≤(≈0.25).

4. The semiconductor device of claim 3, wherein:
   relative to the second direction, the slab portion has a width, Ws;
   a ratio Wr/Ws is in a range of (≈0.083)≤(Wr/Ws)≤(≈0.111).

5. The semiconductor device of claim 3, wherein:
   relative to the width of the rib portion in the second direction, and relative to a height of the rib portion in the third direction, the rib portion has a substantially square shape.

6. The semiconductor device of claim 3, wherein:
   relative to the second direction, a width of the heater is substantially the same as the width of the slab portion.

7. The semiconductor device of claim 1, wherein:
   the stack of metallization layers further includes:
      a first metallization layer (M_1st layer) over the transistor layer; and
      a second metallization layer (M_2nd layer) over the M_1st layer; and
   the one or more beta interconnection layers include:
      a first beta interconnection layer between the M_1st layer and the M_2nd layer; and
   the heater is in the alpha interconnection layer or the first beta interconnection layer.

8. The semiconductor device of claim 7, wherein:
   the heater is in the first beta interconnection layer.

9. The semiconductor device of claim 2, wherein:
   relative to the first and second directions, the heater has a substantially square shape.

10. The semiconductor device of claim 9, wherein:
    relative to a third direction substantially perpendicular to each of the first and second directions, the rib waveguide includes:
       a slab portion: and
       a rib portion stacked on the slab portion;
    relative to the second direction, the rib portion has a width, Wr;
    relative to the second direction, the heater has a width, Wh; and
    a ratio Wr/Wh is in a range of (≈0.185)≤(Wr/Wh)≤(≈0.25).

11. The semiconductor device of claim 1, wherein the heater includes:
    TaN;
    TiN; or
    a combination including TaN and TiN.

12. The semiconductor device of claim 1, wherein:
    relative to the first and second directions, the waveguide has a first portion having a first shape, and the heater has a second shape which is similar to the first shape; and
    the second shape is sized to overlap at least about 80% of the first portion.

13. The semiconductor device of claim 12, wherein:
    the first shape of the first portion of the waveguide is a ring resonator and the second shape of the heater is a ring-like shape; or
    the first shape of the first portion of the waveguide is a double-ring resonator and the second shape of the heater is a figure-eight-like shape; or
    the first shape of the first portion of the waveguide is a U-shape and the second shape of the heater is a U-shape.

14. The semiconductor device of claim 1, wherein:
    relative to the first and second directions, the waveguide has a first plurality of U-shaped portions and a second plurality of U-shaped portions; and
    each U-shaped portion includes an arcuate portion;
    the heater is rectangular; and
    the heater overlaps the arcuate portions of the first plurality of U-shaped portions of the waveguide.

15. A semiconductor device comprising:
    a transistor layer including:
       components of at least one transistor;
       a rib waveguide having a long axis extending in a first direction; and
       an alpha interconnection layer over the rib waveguide;
    a stack of metallization layers over the transistor layer, the stack of metallization layers including one or more beta interconnection layers interposed between corresponding pairs of neighboring ones of the metallization layers;
    a heater in the alpha interconnection layer or in one of the one or more beta interconnection layers; and
    wherein, relative to a second direction substantially perpendicular to the first direction, the heater substantially overlaps at least a portion of the rib waveguide.

16. The semiconductor device of claim 15, wherein:
relative to a third direction substantially perpendicular to each of the first and second directions, the rib waveguide includes:
a slab portion: and
a rib portion stacked on the slab portion;
relative to the second direction, the rib portion has a width, Wr;
relative to the second direction, end portions of the slab portion are not overlapped by the rib portion and have a width, We; and
a ratio Wr/We is in a range of ($\approx$0.185)≤(Wr/We)≤($\approx$0.25).

17. The semiconductor device of claim 16, wherein:
relative to the second direction, the slab portion has a width, Ws;
a ratio Wr/Ws is in a range of ($\approx$0.083)≤(Wr/Ws)≤($\approx$0.111).

18. The semiconductor device of claim 16, wherein:
relative to the width of the rib portion in the second direction, and relative to a height of the rib portion in the third direction, the rib portion has a substantially square shape.

19. A semiconductor device comprising:
a transistor layer including:
components of at least one transistor;
a rib waveguide having a long axis extending in a first direction; and
an alpha interconnection layer over the rib waveguide;
a stack of metallization layers over the transistor layer, the stack of metallization layers including one or more beta interconnection layers interposed between corresponding pairs of neighboring ones of metallization layers; and
a heater in the alpha interconnection layer or in one of the one or more beta interconnection layers; and
wherein:
relative to first and second directions, the rib waveguide has a first portion having a first shape, and the heater has a second shape which is similar to the first shape; and
the second shape is sized to overlap at least about 80% of the first portion.

20. The semiconductor device of claim 19, wherein:
the first shape of the first portion of the rib waveguide is a ring resonator and the second shape of the heater is a ring-like shape; or
the first shape of the first portion of the rib waveguide is a double-ring resonator and the second shape of the heater is a figure-eight-like shape; or
the first shape of the first portion of the rib waveguide is a U-shape and the second shape of the heater is a U-shape.

* * * * *